(12) United States Patent
Mueller

(10) Patent No.: US 10,586,234 B2
(45) Date of Patent: Mar. 10, 2020

(54) SYSTEM AND METHOD FOR DETECTING FRAUDULENT NETWORK EVENTS

(71) Applicant: MasterCard International Incorporated, Purchase, NY (US)

(72) Inventor: Jason M. Mueller, O'Fallon, MO (US)

(73) Assignee: Mastercard International Incorporated, Purchase, NY (US)

( * ) Notice: Subject to any disclaimer, the term of this patent is extended or adjusted under 35 U.S.C. 154(b) by 789 days.

(21) Appl. No.: 14/540,495

(22) Filed: Nov. 13, 2014

(65) Prior Publication Data

US 2015/0134512 A1 May 14, 2015

Related U.S. Application Data

(60) Provisional application No. 61/903,849, filed on Nov. 13, 2013.

(51) Int. Cl.
*G06Q 40/00* (2012.01)
*G06Q 20/40* (2012.01)

(52) U.S. Cl.
CPC .............................. *G06Q 20/4016* (2013.01)

(58) Field of Classification Search
CPC .... G06Q 20/10; G06Q 20/102; G06Q 20/105; G06Q 20/206; G06Q 30/02
See application file for complete search history.

(56) References Cited

U.S. PATENT DOCUMENTS

| | | |
|---|---|---|
| 7,249,094 B2 | 7/2007 | Levchin et al. |
| 7,562,814 B1 | 7/2009 | Shao et al. |
| 7,707,089 B1 * | 4/2010 | Barton ................. G06Q 20/10 235/380 |
| 7,793,835 B1 | 9/2010 | Coggeshall et al. |
| 2004/0148256 A1 * | 7/2004 | Bramnick ............. G06Q 20/04 705/40 |
| 2005/0154676 A1 * | 7/2005 | Ronning ............... G06Q 20/10 705/44 |

(Continued)

OTHER PUBLICATIONS

Delamaire, Linda (Credit card fraud and detection techniques: a review; Banks and Bank Systems, vol. 4, Issue 2, 2009 file:///C:/Users/mgaw/Downloads/BBS.pdf 2009) (Year: 2009).*

*Primary Examiner* — Bruce I Ebersman
*Assistant Examiner* — Mark H Gaw
(74) *Attorney, Agent, or Firm* — Armstrong Teasdale LLP

(57) ABSTRACT

A computing device for detecting fraudulent network events in a payment card transaction network is provided. The computing device includes a processor and a display device. The computing device is programmed to receive a first plurality of fraud data elements associated with a plurality of payment card transactions from a fraud detection system. The computing device is also programmed to generate a first graph from the first plurality of fraud data elements. The computing device is further programmed to receive a first plurality of data elements associated with the plurality of payment card transactions from a second system. The computing device is also programmed to generate a second graph from the first plurality of data elements and display both of the first graph and the second graph simultaneously to a user on the display device, such that the user to detect fraudulent events in the payment card transaction network.

15 Claims, 16 Drawing Sheets

(56) References Cited

U.S. PATENT DOCUMENTS

| | | | |
|---|---|---|---|
| 2005/0222929 A1* | 10/2005 | Steier | G06Q 40/00 705/35 |
| 2006/0032909 A1* | 2/2006 | Seegar | G06Q 20/04 235/380 |
| 2010/0274723 A1* | 10/2010 | Joao | G06Q 20/04 705/44 |
| 2010/0327056 A1* | 12/2010 | Yoshikawa | G06Q 20/40 235/380 |
| 2011/0004498 A1* | 1/2011 | Readshaw | G06Q 20/24 705/318 |
| 2011/0041058 A1* | 2/2011 | Butler | G06F 21/552 715/709 |
| 2012/0278021 A1 | 11/2012 | Lin et al. | |

* cited by examiner

SYSTEM AND METHOD FOR DETECTING FRAUDULENT NETWORK EVENTS

CROSS-REFERENCE TO RELATED APPLICATION

This application claims the benefit of U.S. Provisional Patent Application No. 61/903,849 filed on Nov. 13, 2013, which is hereby incorporated by reference herein in its entirety.

BACKGROUND OF THE DISCLOSURE

This disclosure relates generally to fraud monitoring of payment card transactions on a payment card transaction network and, more particularly, to systems and methods for analyzing fraud data generated by fraud detection systems used for detecting fraudulent network events.

Payment processing networks process numerous payment transactions every day that are initiated by cardholders of payment cards. Most of these transactions are valid transactions. However, at least some of these transactions are fraudulent. Payment transaction processors, such as payment networks and issuing banks, may monitor payment card transactions for signs of fraudulent activity. At least some known fraud detection systems monitor payment transactions one payment transaction at a time to determine whether the transaction is potentially fraudulent. However, none of the known fraud detection systems analyze fraud detection data to determine patterns or trends associated with fraudulent transactions. Further, fraud detection systems may fail in some respects, and such failures may go unnoticed if the fraud monitoring system is not, itself, monitored.

BRIEF DESCRIPTION OF THE DISCLOSURE

In one aspect, a computing device for detecting fraudulent network events in a payment card transaction network is provided. The computing device includes a processor and a display device. The computing device is programmed to receive a first plurality of fraud data elements associated with a plurality of payment card transactions from a fraud detection system. The computing device is also programmed to generate a first graph from the first plurality of fraud data elements. The computing device is further programmed to receive a first plurality of data elements associated with the plurality of payment card transactions from a second system. The computing device is also programmed to generate a second graph from the first plurality of data elements. The computing device is further programmed to display both of the first graph and the second graph simultaneously to a user on the display device, such that the user to detect fraudulent events in the payment card transaction network.

In another aspect, a computer-implemented method for detecting fraudulent network transactions in a payment card transaction network is provided. The method uses a computing device having a processor and a display device. The method includes receiving a first plurality of fraud data elements associated with a plurality of payment card transactions from a fraud detection system. The method also includes generating, by the processor, a first graph from the first plurality of fraud data elements. The method further includes receiving a first plurality of data elements associated with the plurality of payment card transactions from a second system. The method also includes generating, by the processor, a second graph from the first plurality of data elements. The method further includes displaying both of the first graph and the second graph simultaneously to a user on the display device, such that the user to detect fraudulent events in the payment card transaction network.

In yet another aspect, at least one non-transitory computer-readable storage media having computer-executable instructions embodied thereon is provided. When executed by at least one processor, the computer-executable instructions cause the processor to receive a first plurality of fraud data elements associated with a plurality of payment card transactions from a fraud detection system. The computer-executable instructions also cause the processor to generate a first graph from the first plurality of fraud data elements. The computer-executable instructions further cause the processor to receive a first plurality of data elements associated with the plurality of payment card transactions from a second system. The computer-executable instructions also cause the processor to generate a second graph from the first plurality of data elements. The computer-executable instructions further cause the processor to display both of the first graph and the second graph simultaneously to a user on the display device, such that the user to detect fraudulent events in the payment card transaction network.

BRIEF DESCRIPTION OF THE DRAWINGS

FIGS. 1-15 show example embodiments of the methods and systems described herein.

FIG. 1 is a schematic diagram illustrating an example multi-party payment card industry system for enabling ordinary payment-by-card transactions in which merchants and card issuers do not necessarily have a one-to-one relationship.

FIG. 2 is a simplified block diagram of an example fraud management system including a plurality of computer devices in accordance with one example embodiment of the present disclosure.

FIG. 3 is an expanded block diagram of an example embodiment of a server architecture of the fraud management server shown in FIG. 2 including a plurality of computer devices in accordance with one example embodiment of the present disclosure.

FIG. 4 illustrates an example configuration of a client system shown in FIGS. 2 and 3.

FIG. 5 illustrates an example configuration of a server system shown in FIGS. 2 and 3.

FIG. 7 is a diagram of an example data management system for authorization and fraud monitoring of payment card transactions that is implemented on the server shown in FIG. 2.

FIG. 8 is a diagram of a portion of an example user interface showing a plurality of information display areas that are generated by the fraud management system shown in FIG. 6A and displayed to a fraud analyst such as the user shown in FIG. 6A.

FIG. 9 is a diagram of an example set of graphs that are generated by the fraud management system shown in FIG. 6A for display to the user shown in FIG. 6A.

FIG. 10 is a graph generated by the fraud management system shown in FIG. 6A for display to the user shown in FIG. 6A.

FIG. 11 is a graph of rule activity that may be presented to an analyst by the fraud management server shown in FIG. 6A or dashboard application shown in FIG. 7.

FIG. 12 is a diagram of an example set of graphs that are generated by the fraud management system shown in FIG. 6 for display to the user shown in FIG. 6A.

FIG. 13 is a diagram of an example set of graphs that are generated by the fraud management system shown in FIG. 6 for display to the user shown in FIG. 6A.

FIG. 14 shows an example configuration of a database within a computing device, along with other related computing components, that may be used during fraud monitoring of payment card transactions.

FIG. 15 is an example method for detecting fraudulent network transactions in a payment card transaction network such as the transaction system shown in FIG. 1.

DETAILED DESCRIPTION OF THE DISCLOSURE

Figure 1:
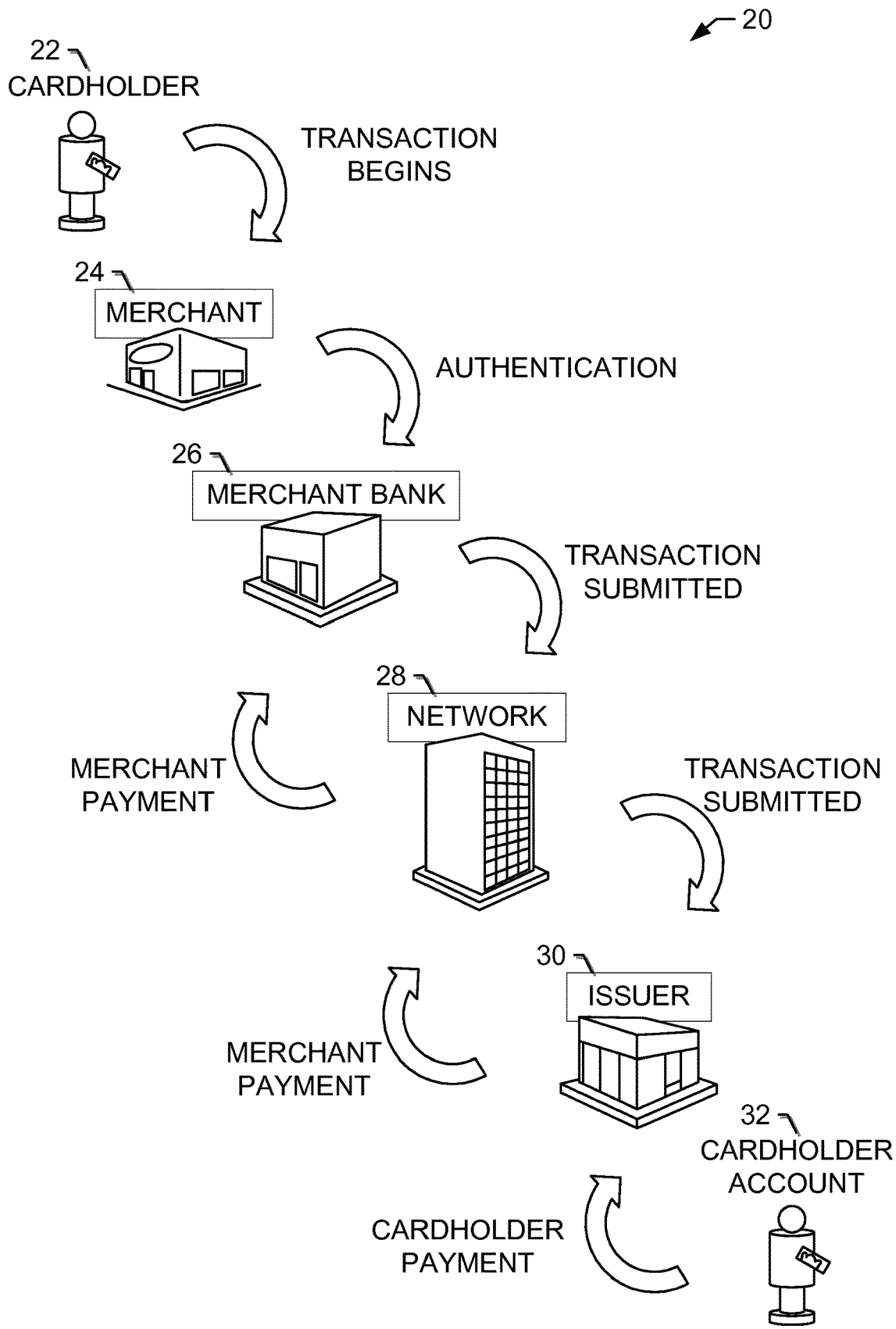

Embodiments of the present disclosure describe a fraud management system and method implemented using a computing system that is in communication with a fraud detection system and/or a data warehouse. The methods and systems described herein analyze data generated by the fraud detection systems and transform fraud data into a graphical presentation in real time. In one embodiment, a fraud detection system detects suspected fraudulent payment card transactions, creates fraud cases for further investigation, and generates outputs (e.g., scores) for those suspect transactions. As described herein, a fraud management system receives various types of fraud data from the fraud detection system as inputs for further analysis. The fraud management system aggregates and correlates data (i.e., trend analysis data) and presents specific views of the trend analysis data to analysts. In some embodiments, the fraud management system may take remedial actions, while in other embodiments the analyst may take remedial actions based on the output of the fraud management system. The fraud management system receives key metric information as inputs from the fraud detection system. For example, the fraud management system receives information about fraud cases created, information about confirmed fraud cases, information about ongoing (i.e., pending) fraud cases, information about demographic-based activity, information about system integrity and response times, and information about processing facilities. Some or all of this data may be stored in various data warehouse databases accessed by the fraud management system during processing.

This system and method increases the effectiveness of payment card fraud detection. One element of the system is the visual representation of outputs from multiple systems, such as, for example, a transaction authorization engine, a fraud detection system, and a fraud confirmation system. Combining data from these systems into a comprehensive view allows analysts to evaluate the performance of fraud monitoring devices and detect anomalies in transaction activity trends that may indicate additional fraud which may have evaded automated detection. Because fraud detection rules are generally created in response to known circumstances and events, a need exists for real-time detection of fraudulent card activity by human analysts. This system provides the support tools for analysts to spot fraud that may have escaped detection by conventional, established means.

The fraud management system processes the information, and displays the information to a user in real time through a dashboard application. The user may be, for example, a member of a fraud management team, an operations monitor, and/or a production support staff member (herein referred to collectively as "analysts") that watches the dashboard, for example, for trends in fraud, and takes actions based on the data displayed. In some embodiments, the fraud management system aggregates data by categories, such as by issuer, by analyst group, by the triggered fraud rule, or by system component. In some embodiments, the analyst may tune configuration parameters of the fraud detection system based on trends or other events witnessed through monitoring the fraud management system. For example, through the aggregate data produced by the fraud management system, the analyst may notice a fraud attack trend which present rules are not sufficiently capturing (e.g., fraudulent transactions that are not scoring high enough to be identified by the present rules, or through other notifications of suspected fraud). The system or the analyst may subsequently change the threshold levels within the fraud detection system, or may institute new rules for scoring certain types of transactions. As such, the analyst may notice issues with the performance of the fraud detection system and may take corrective actions based on these trends. As such, the fraud management system computes data transformations using the fraud detection data and delivers a graphical representation of production activity that provides an analyst insight into system operations and promotes trend visibility for early detection of problems.

In other embodiments, the fraud management system generates aggregation data from the fraud detection system that may be used for health monitoring of various aspects of the fraud detection system. For example, the fraud management system aggregates the total number of cases being generated by a particular sub-system of the fraud detection system every minute and displays a graph in real time to the dashboard. If a sub-system associated with case generation starts to fail, the case count may dip abnormally below a particular threshold, and the system or the analyst may notice and react to the abnormal condition. Further, the system calculates an anticipated value for various parameters, such as the number of cases expected to be generated during a particular period of time. The system and/or the analyst may use this anticipation value a measure of how many a normal, "healthy" system should be generating. If the real values at the time deviate too much from that anticipated value, the system and/or the analyst may react based on such data.

Further, multiple vectors of system data may be used to correlate and troubleshoot particular scenarios. For example, the fraud management system may display both the above-described case generation analysis and display alongside a display of the recent communications response times for the system or sub-system associated with case generation. Presume, for example, that network response times from that same sub-system increase at approximately the same time as the number of cases being generated decrease. This may indicate that either the sub-system is completely down, or that the sub-system is underperforming in some way. As such, the combination of data from the case generation analysis and the network response time analysis give greater detail to the cause of the underlying problem than either does in isolation.

For another example, one known fraudulent activity is the systematic interrogation of card authentication mechanisms to ascertain valid authentication codes. The present system enables an analyst to monitor for combinations of authorization responses in aggregate, thereby enabling quick identification of the source terminal of brute force attacks. This allows the acquiring institution to more quickly take remedial steps (e.g., during or shortly after the attack is identified). Detection may be achieved by identifying a certain type of anomaly from a visual collection of, for example, approval/decline of transaction authorization requests, activity of fraud detection and confirmation systems, and purchase or ATM withdrawal velocity. Further, results may be presented, for example, in terms of merchant, acquirer, or class thereof.

Further, in some embodiments, a notification system may be triggered by a combination of one or more threshold-based alerts (e.g., alerts indicating the presence of multiple real-time, non-correlated statistical anomalies). For example, the system may provide a visual, email, text message, or other notification to analysts when a business velocity indicator and a transaction decline indicator have simultaneously deviated significantly from the mean.

At least one of the technical problems addressed by this system includes: (i) undetected network-based fraud events perpetrated by fraudsters on a payment transaction network; (ii) increased network load based on some types of fraud events; and (iii) computational burdens imposed by automated fraud monitoring systems. Other technical problems addressed by the system and methods described herein may include increased network usage (slowing down the network) due to undetected frauds (e.g., systematic attacks to determine card verification numbers through trial and error).

The methods and systems described herein may be implemented using computer programming or engineering techniques including computer software, firmware, hardware, or any combination or subset thereof, wherein the technical effects may be achieved by performing at least one of the following steps: (a) receiving a first plurality of fraud data elements associated with a plurality of payment card transactions from a fraud detection system; (b) generating, by the processor, a first graph from the first plurality of fraud data elements; (c) receiving a first plurality of data elements associated with the plurality of payment card transactions from a second system; (d) generating, by the processor, a second graph from the first plurality of data elements; (e) displaying both of the first graph and the second graph simultaneously to a user on the display device, thereby enabling the user to detect fraudulent events in the payment card transaction network; (f) displaying a first graph covering a first time period and a second graph covering a second time period that at least partially overlaps with the first time period; (g) aligning a time axis for each of the first graph and the second graph vertically based on an overlapping portion of the first time period and the second time period, thereby enabling the user to vertically compare data on the first graph to corresponding data on the second graph; (h) receiving a first plurality of fraud data associated with payment transaction declines based at least in part on a set of one or more decline rules; (i) plotting a first plot and a second plot on the first graph, wherein the first plot includes payment transaction declines for a first period of time, wherein the second plot includes payment transaction declines for a historical period of time prior to the first period of time; (j) receiving a first plurality of data elements associated with rule activity based at least in part on a set of one or more decline rules; and (k) receiving data associated with fraud cases created by the fraud detection system.

The resulting technical effect achieved by this system is at least one of: (i) reducing network-based fraud events through, e.g., early detection and elimination of fraudster traffic; (ii) enabling correlation of multiple network data views to detect fraud events; and (iii) eliminating economic loss through, e.g., early detection and reaction to fraudulent network events. Thus, the system enables enhanced fraud detection on the payment card transaction network, which results in a reduced amount of fraudulent network traffic, and thus a reduced burden on the network.

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transactions card can be used as a method of payment for performing a transaction. In addition, consumer card account behavior can include but is not limited to purchases, management activities (e.g., balance checking), bill payments, achievement of targets (meeting account balance goals, paying bills on time), and/or product registrations (e.g., mobile application downloads).

As used herein, the term "fraud" is used in the context of payment card transactions and refers, generally, to an unprivileged use of a payment card. For example, a thief may steal a consumer's payment card and attempt to use it for purchases. This type of transaction may be monitored by, for example, a fraud detection system within a payment network. Further, as used herein, a "suspected fraudulent transaction" is a transaction that is suspected to be fraudulent, but which has not yet been confirmed as fraudulent by, for example, the consumer of the underlying payment card, or the issuing bank, or an analyst associated with the fraud detection system.

As used herein, the term "real-time" is used, in some contexts, to refer to a regular updating of data within a system such as the fraud detection systems, the fraud management systems, and/or the displays described herein. When a system is described as processing or performing a particular operation "in real-time," this may mean within seconds or minutes of an occurrence of some trigger event, such as new data being generated, or on some regular schedule, such as every minute. In other contexts, some transactions require "real-time" fraud operations, such as fraud scoring, which refers to operations performed during authorization of a payment card transaction (i.e., between the moment that a new transaction is initiated from, for example, a merchant, and the time that an authorization decision is made, for example, back to that merchant). In such a context, "near real-time" fraud operations are operations conducted shortly after the transaction has occurred (i.e., after an authorization decision is made).

The systems and processes are not limited to the specific embodiments described herein. In addition, components of each system and each process can be practiced independent and separate from other components and processes described herein. Each component and process also can be used in combination with other assembly packages and processes.

The following detailed description illustrates embodiments of the disclosure by way of example and not by way of limitation. It is contemplated that the disclosure has general application to fraud management of payment card transactions.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram illustrating an example multi-party transaction card industry system 20 for enabling ordinary payment-by-card transactions in which merchants 24 and card issuers 30 do not need to have a one-to-one special relationship. Typical financial transaction networks enable payment card transactions, some of which are fraudulent. For example, fraudulent transactions may be introduced through a merchant, for example, in an attempt to deceive an issuer into authenticating a transaction with a payment card that is not owned and/or controlled by the person presenting the card at a time of purchase. Such transactions may be monitored for fraudulent activity.

Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In a typical transaction card system, a financial institution called the "issuer" issues a transaction card, such as a credit card, to a consumer or cardholder 22, who uses the transaction card to tender payment for a purchase from a merchant 24. To accept payment with the transaction card, merchant 24 must normally establish an account with a financial institution that is part of the financial payment system. This financial institution is usually called the "merchant bank," the "acquiring bank," or the "acquirer." When cardholder 22 tenders payment for a purchase with a transaction card, merchant 24 requests authorization from a merchant bank 26 for the amount of the purchase. The request may be performed over the telephone, but is usually performed through the use of a point-of-sale terminal, which reads cardholder's 22 account information from a magnetic stripe, a chip, or embossed characters on the transaction card and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 28, computers of merchant bank 26 or merchant processor will communicate with computers of an issuer bank 30 to determine whether cardholder's 22 account 32 is in good standing and whether the purchase is covered by cardholder's 22 available credit line. Based on these determinations, the request for authorization will be declined or accepted. If the request is accepted, an authorization code is issued to merchant 24.

When a request for authorization is accepted, the available credit line of cardholder's 22 account 32 is decreased. Normally, a charge for a payment card transaction is not posted immediately to cardholder's 22 account 32 because bankcard associations, such as MasterCard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns goods after the transaction has been captured, a "credit" is generated. Interchange network 28 and/or issuer bank 30 stores the transaction card information, such as a type of merchant, amount of purchase, date of purchase, in a database 120 (shown in FIG. 2).

After a purchase has been made, a clearing process occurs to transfer additional transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction. In the example embodiment, when cardholder 22 purchases travel, such as airfare, a hotel stay, and/or a rental car, at least partial itinerary information is transmitted during the clearance process as transaction data. When interchange network 28 receives the itinerary information, interchange network 28 routes the itinerary information to database 120.

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

As described below in more detail, a fraud detection system (not shown in FIG. 1) may be used to analyze payment card transactions for fraud. The fraud detection system may be configured to collect and/or generate fraud data associated with payment card transactions, and to provide this data to a fraud management system (not shown in FIG. 1) for further processing.

Figure 2:
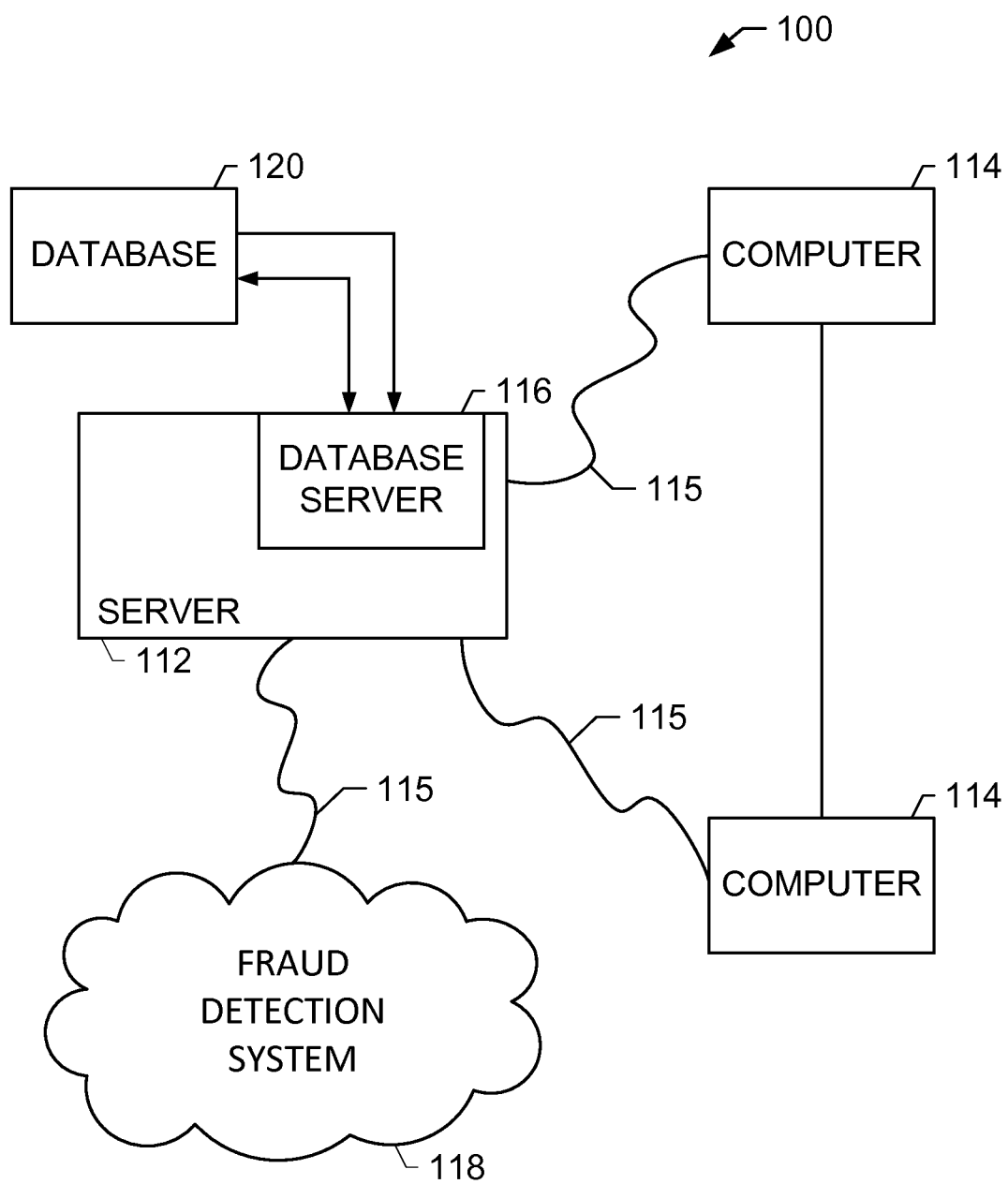

FIG. 2 is a simplified block diagram of an example fraud management system 100 including a plurality of computer devices connected in communication in accordance with the present disclosure. In the example embodiment, system 100 is used for processing data from a fraud detection system 118 as described herein. More specifically, in the example embodiment, system 100 includes a fraud management server 112, and a plurality of client sub-systems, also referred to as client systems 114, connected to fraud management server 112. In one embodiment, client systems 114 are computers including a web browser, such that fraud management server 112 is accessible to client systems 114 using the Internet. Client systems 114 are interconnected to the Internet through many interfaces including a network 115, such as a local area network (LAN) or a wide area network (WAN), dial-in-connections, cable modems, special high-speed Integrated Services Digital Network (ISDN) lines, and RDT networks. Client systems 114 could be any device capable of interconnecting to the Internet including a web-based phone, PDA, or other web-based connectable equipment.

A database server 116 is connected to database 120, which contains information on a variety of matters, as described below in greater detail. In one embodiment, centralized database 120 is stored on fraud management server 112 and can be accessed by potential users at one of client systems 114 by logging onto fraud management server 112 through one of client systems 114. In an alternative embodiment, database 120 is stored remotely from fraud management server 112 and may be non-centralized.

Database 120 may include a single database having separated sections or partitions, or may include multiple databases, each being separate from each other. Database 120 may store transaction data generated over the processing network including data relating to payment card transactions, fraudulent payment card transactions, and fraud scoring values and rules. Database 120 may also store account data including at least one of a cardholder name, a cardholder address, an account number, other account identifiers, and transaction information. Database 120 may also store merchant data including a merchant identifier that identifies each merchant registered to use the network, and instructions for settling transactions including merchant bank account information. Database 120 may also store purchase data associated with items being purchased by a cardholder from a merchant, and authorization request data. Database 120 may also store fraud information received from fraud detection system 118.

In the example embodiment, one of client systems 114 may be associated with acquirer bank 26 (shown in FIG. 1) while another one of client systems 114 may be associated with issuer bank 30 (shown in FIG. 1). Fraud management server 112 may be associated with interchange network 28. In the example embodiment, fraud management server 112 is associated with a network interchange, such as interchange network 28, and may be referred to as an interchange computer system. Fraud management server 112 may be used for processing transaction data and/or analyzing fraud data associated with payment card transactions. In addition, client systems 114 may include a computer system associated with at least one of an online bank, a bill payment outsourcer, an acquirer bank, an acquirer processor, an issuer bank associated with a transaction card, an issuer processor, a remote payment system, customers and/or billers.

Figure 3:
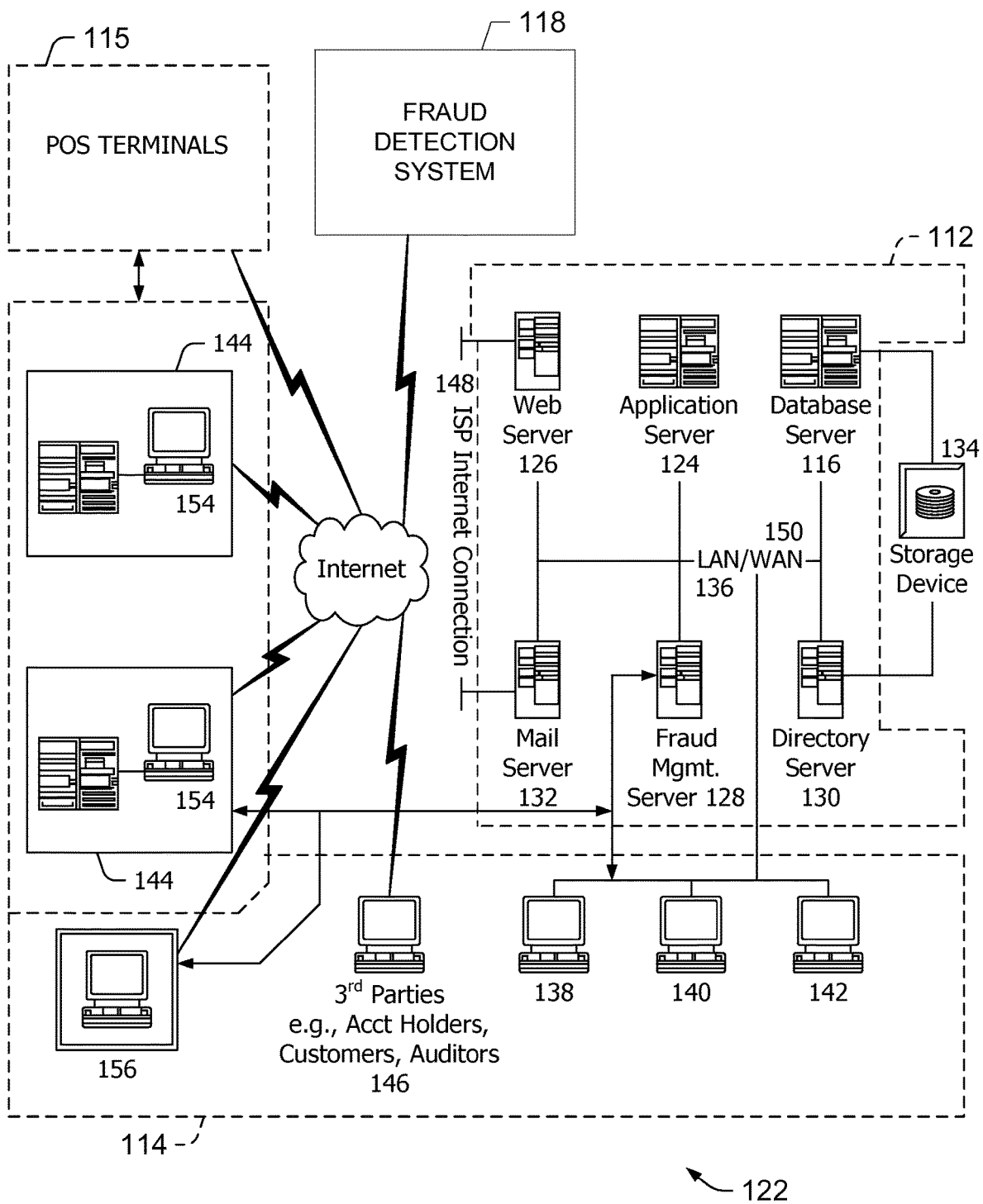

FIG. 3 is an expanded block diagram of an example embodiment of a server architecture of fraud management server 112 including other computer devices in accordance with one embodiment of the present disclosure. Components in system 122, identical to components of system 100 (shown in FIG. 2), are identified in FIG. 3 using the same reference numerals as used in FIG. 2. System 122 includes fraud management server 112, client systems 114, POS terminals 115, and fraud detection system 118. Fraud management server 112 further includes database server 116, a transaction server 124, a web server 126, a fraud management server 128, a directory server 130, and a mail server 132. A storage device 134 is coupled to database server 116 and directory server 130. Servers 116, 124, 126, 128, 130, and 132 are coupled in a local area network (LAN) 136. In addition, an issuer bank workstation 138, an acquirer bank workstation 140, and a third party processor workstation 142 may be coupled to LAN 136. In the example embodiment, issuer bank workstation 138, acquirer bank workstation 140, and third party processor workstation 142 are coupled to LAN 136 using network connection 115. Workstations 138, 140, and 142 are coupled to LAN 136 using an Internet link or are connected through an Intranet.

Each workstation 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Fraud management server 112 is configured to be communicatively coupled to various individuals, including employees 144 and to third parties, e.g., account holders, customers, auditors, developers, consumers, merchants, acquirers, issuers, etc., 146 using an ISP Internet connection 148. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the example embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with fraud management server 112.

Also, in the example embodiment, web server 126, application server 124, database server 116, and/or directory server 130 may host web applications, and may run on multiple servers 112. The term "suite of applications," as used herein, refers generally to these various web applications running on server systems 112.

Furthermore, fraud management server 128 is configured, in the example embodiment, to receive data from fraud detection system 118 and provide fraud monitoring services for fraud detection system 118. Fraud management server 128 may communicate with remotely located client systems, including a client system 156. Fraud management server 128 may be configured to communicate with other client systems 138, 140, and 142 as well.

Figure 4:
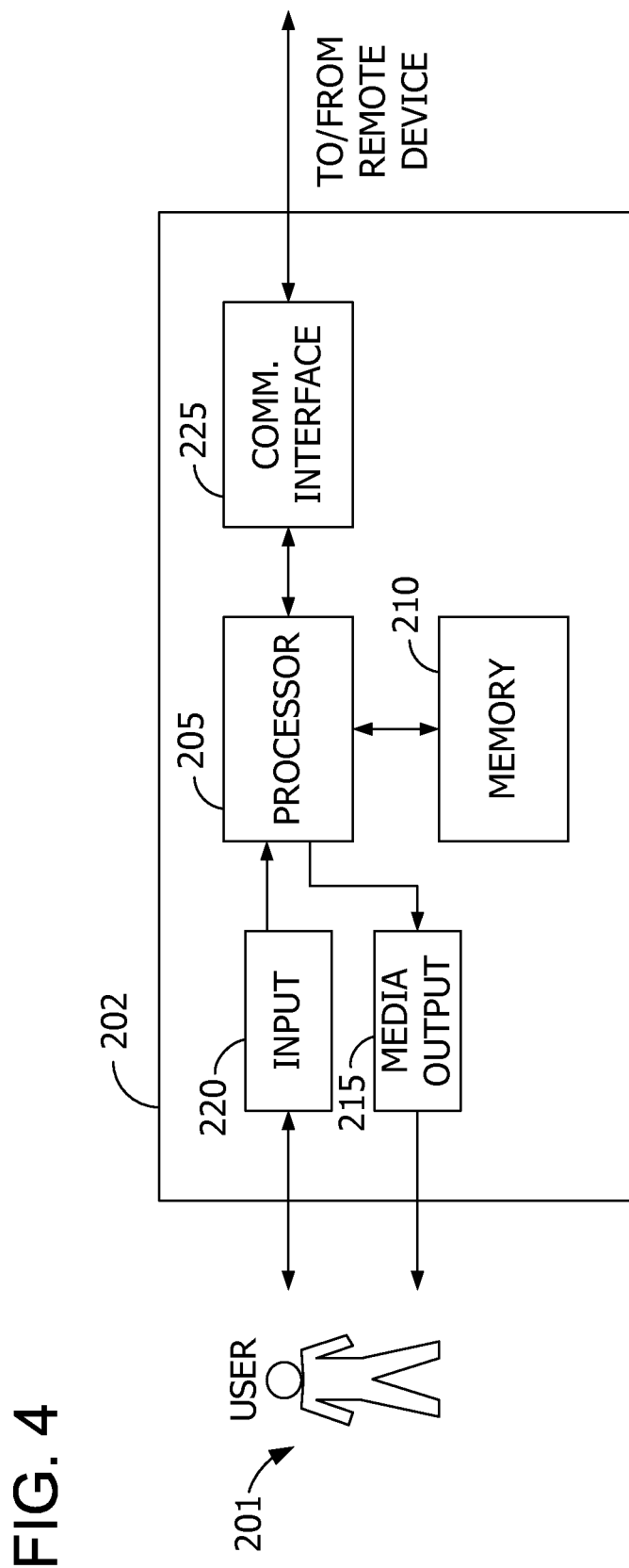

FIG. 4 illustrates an example configuration of a user system 202 operated by a user 201, such as an analyst. User system 202 may include, but is not limited to, client systems 114, 138, 140, and 142, POS terminal 115, workstation 154, manager workstation 156, and fraud detection system 118 (all shown in FIG. 3). In the example embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

User system 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively couplable to a remote device such as fraud management server 112. Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WI-MAX).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from fraud management server 112. A client application allows user 201 to interact with a server application from fraud management server 112.

In operation, in the example embodiment, user 201, such as an analyst, uses user system 202 to interact with the suite of web applications hosted by fraud management server 112 (shown in FIG. 3) using a web browser or other graphical user interface.

Figure 5:
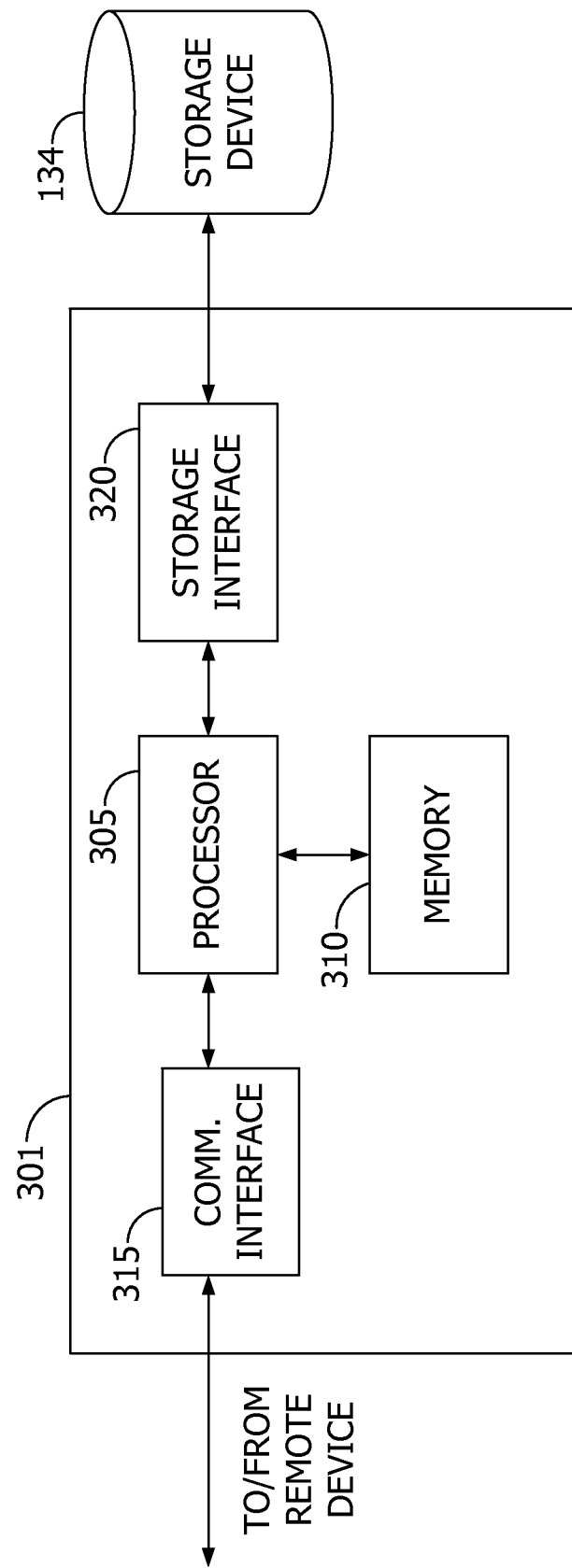

FIG. 5 illustrates an example configuration of a server system 301 such as fraud management server 112 (shown in FIGS. 2 and 3). Server system 301 may include, but is not limited to, database server 116, transaction server 124, web server 126, fraud management server 128, directory server 130, and mail server 132. In the example embodiment, server system 301 performs fraud management functions and features associated with monitoring payment card fraud and fraud detection system 118 (shown in FIG. 2).

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as a user system or another server system 301. For example, communication interface 315 may receive requests from user system 114 via the Internet, as illustrated in FIGS. 2 and 3.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

In operation, fraud management server 128 (shown in FIG. 3) runs on server system 301. User 201 (shown in FIG. 4) interacts with server system 301, and processes such as the fraud management server 128, using user system 202 (shown in FIG. 1).

Figure 6A:
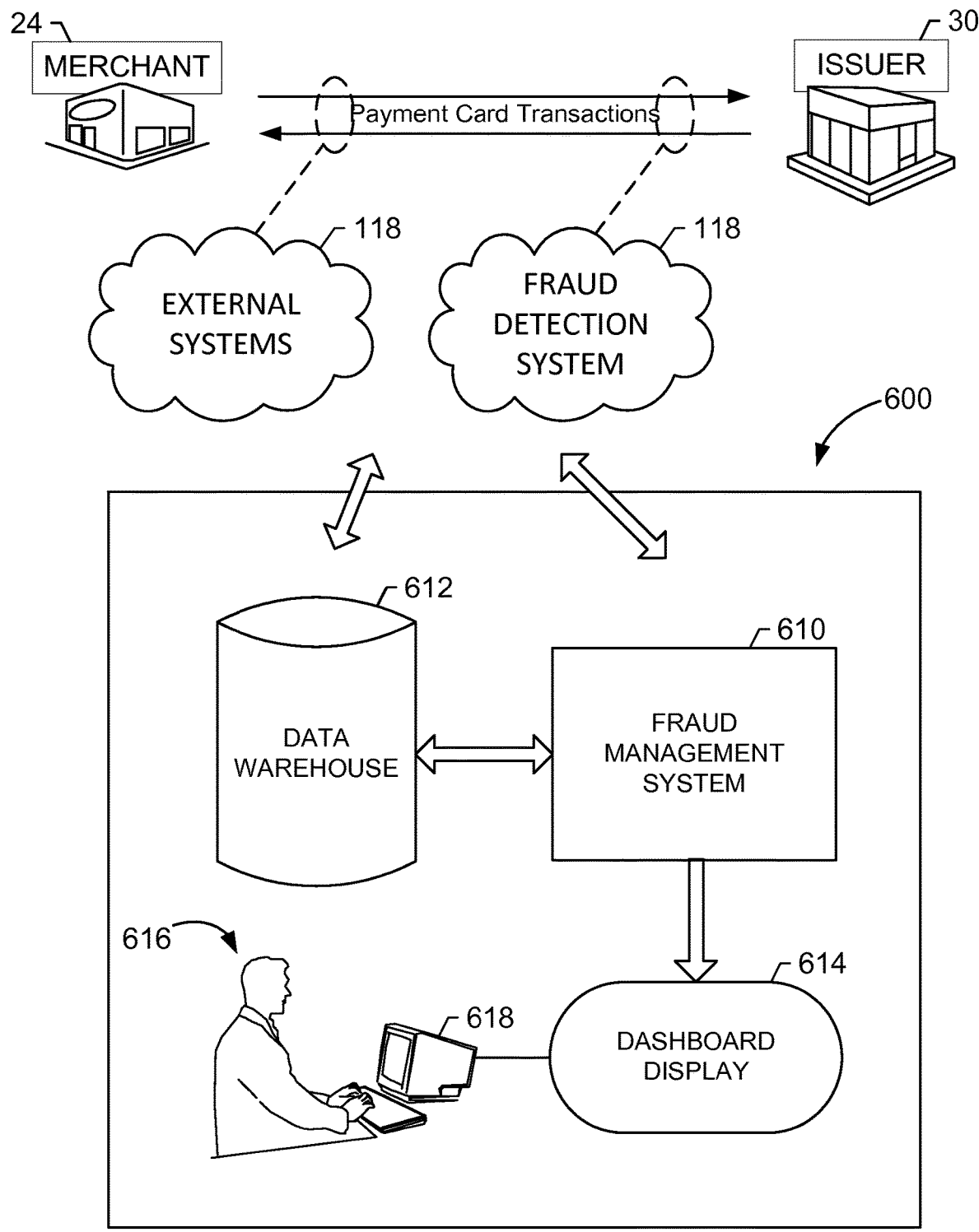
FIG. 6a is a diagram of an example fraud management system for fraud monitoring of payment card transactions that is implemented on the server shown in FIG. 2.

FIG. 6a is a diagram of an example fraud management system 600 for fraud monitoring of payment card transactions that is implemented on server 112 (shown in FIG. 2). In the example embodiment, a fraud detection system 118 monitors payment card transactions between, for example, merchants 24 and issuers 30. In some embodiments, other external systems 118 such as other fraud detection systems also interact with fraud management system 600. Fraud detection system 118 performs functions with respect to payment card transactions such as, for example, fraud detection (i.e., evaluation of the details and circumstances surrounding payment card transactions, and assigning an initial decision as to whether or not certain transactions are fraudulent), fraud case creation (i.e., creating cases for individual instances of fraud), case management (i.e., tools that analysts may use to investigate and/or analyze cases), and rules customization (i.e., tools that allow analysts to customize and/or change rules and models associated with the fraud detection functionality).

In the example embodiment, fraud management system 600 receives inputs from, and otherwise interacts with, fraud detection system 118. More specifically, fraud management system 600 includes a fraud management server 610 that communicates with both a data warehouse 612 and fraud detection system 118. In some embodiments, data warehouse 612 may be database server 116 and/or database 120 (shown in FIG. 2), or storage device 134 (shown in FIG. 3). In other embodiments, fraud management system 600 also receives health and processing data from other systems (not shown) and from sub-systems of fraud detection system 118 such as, for example, communications metrics associated various sub-systems. During operation, fraud management server 610 analyzes various aspects of data received from fraud detection system 118 and/or data warehouse 612, and displays outputs to a dashboard display 614 which is presented to a user 616 of a computing device 618, such as computing device 202 (shown in FIG. 4).

Figure 6B:
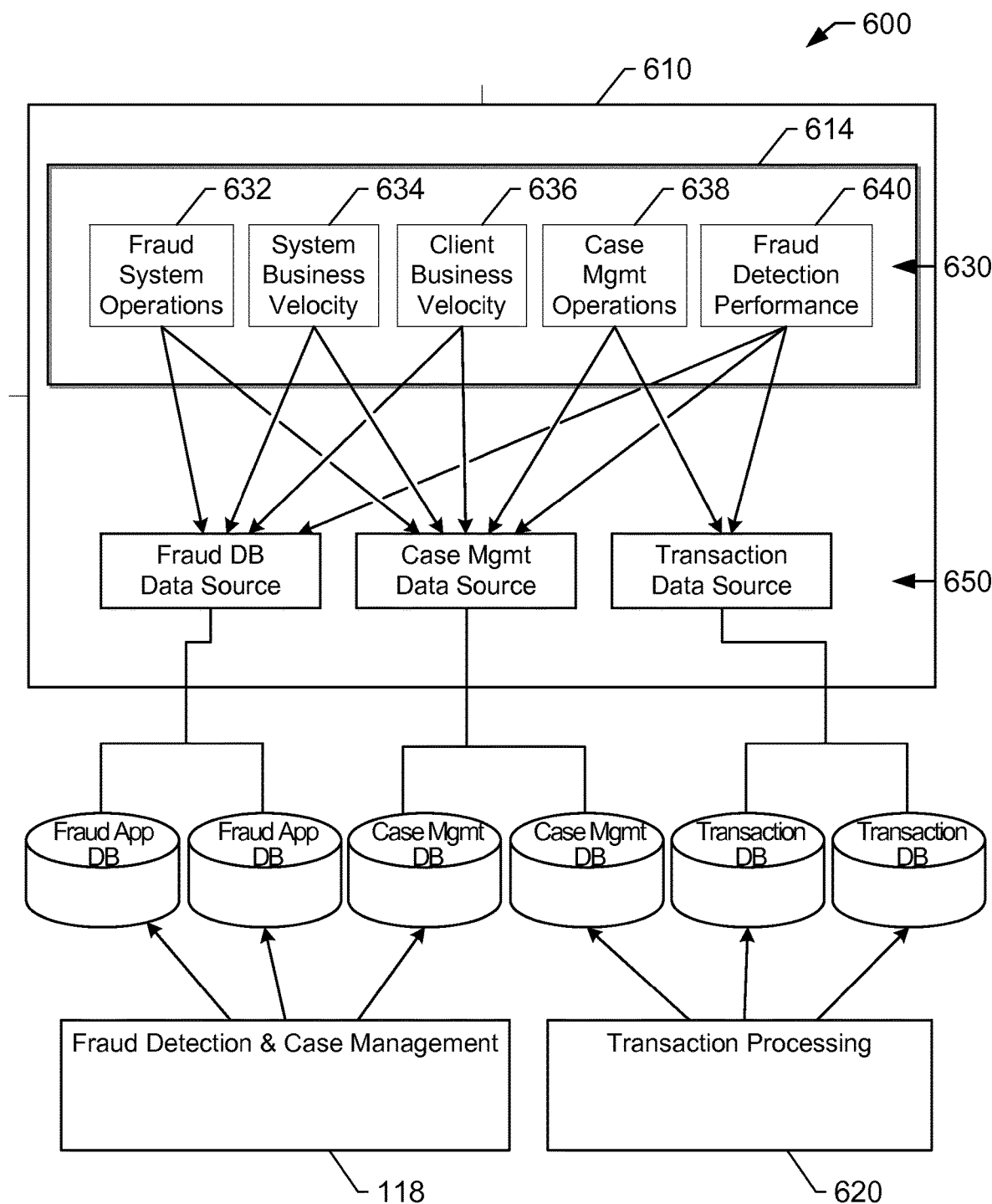
FIG. 6b is a more detailed diagram of the example fraud management system shown in FIG. 6a for fraud monitoring of payment card transactions.

FIG. 6b is a more detailed diagram of the example fraud management system 600 shown in FIG. 6a for fraud monitoring of payment card transactions. In the example embodiment, fraud management system 600 includes a plurality of dashboard modules 630 associated with dashboard display 614. A fraud system operations module 632 may, for example, provide real-time application performance on billing and/or other data extracts such as, for example, virtual analyst polling per system, cases created per minute per system, hotlist usage per minute per system, and web service response times. A system business velocity module 634 may, for example, provide data associated with case creation, transactions scored in real time, transactions scored near real time, web service utilization per system, web service utilization per issuer, rule activity per minute per issuer, tenant, and/or service center, rule activity per hour per system, transactions per minute, fraud system rule declines per minute per tenant, user activity, and/or hourly non-monetary transactions.

A client business velocity module 636 may, for example, provide data associated with case creation, transactions scored in real time, transactions scored near real time, web service executions, rule activity per minute per service center, overall transaction activity, transactions declined based on fraud score, fraud system rule declines per minute per tenant, and/or hourly non-monetary transactions. A case management operations module 638 and a fraud detection performance module 640 may, for example, provide data associated with case manager and expert user activity, web service executions, web service utilization per system, rule activity per minute, case creation, analyst polling, and/or hotlist usage.

Each dashboard module 630 receives data from one or more data modules 650 generated by fraud management system 600. Each data module 650 is processed using data from one or more input databases 660 and/or other performance or communications data associated with other systems or sub-systems such as, for example, fraud detection system 118. In some embodiments, fraud detection system 118 provides one or more of fraud data and fraud case management data to databases 660. In other embodiments, a transaction processing system 620 provides data to fraud management system 600 such as, for example, detailed transaction information on suspected fraudulent transactions. In some embodiments, one or more of databases 660 and/or data modules 650 may be data warehouse 612 (shown in FIG. 6a). Further, in some embodiments, each dashboard module 630 includes one or more chart objects (not separately shown in FIG. 6b), wherein each chart object accesses one or more data modules 650.

In other embodiments, data modules 650 may include time range values, client identifiers, service centers, aggregated metrics from the time range and its segments, historical basis metrics, and threshold values. In some embodiments, dashboard modules 630 also include a data import module (not shown) that includes data involving the success or failure of import tasks associated with fraud management system 600 and/or fraud detection system 118. In other embodiments, dashboard modules 630 include a virtual analyst module (not shown) that aggregates polling results from a virtual analyst system which performs automated confirmations of system-indicated fraud events. This module aggregates polling results in multiple groupings including, for example, virtual analyst case polling per issuer, case polling per fraud rule, and/or case polling per system/component. In still other embodiments, dashboard modules 630 include a web service performance module (not shown).

Web services are requests made by external systems 118 of fraud analysts performing case management activities. The web service performance module aggregates response time and activity trends for these web services. In other embodiments, a data extract module (not shown) is provided for monitoring batch activities that periodically extract data.

In some embodiments, historical data may be leveraged to compute an anticipation value for particular metrics. For example, presume an embodiment in which system 600 analyzes case creation data for a particular issuer. System 600 may receive case creation data in real time from fraud detection system 118 indicating how many cases the system 118 has created, for example, in the last 1 minute (i.e., since system 118 last transmitted the previous case creation value from the prior minute). Fraud management system 600 aggregates the values for that issuer over, for example, all of the previous hour's case creation values to arrive at a total hourly value of cases created within the last hour for that issuer. In addition, system 600 creates a historical anticipated value for that issuer from, for example, the same hour of the previous week, or previous month, or previous year. In other words, the anticipated value is the number of cases created for that issuer at this same hour of the prior period. System 600 and/or the analyst may compare the most recent number of cases created (i.e., how many have been created in the last hour) to the anticipated value (i.e., how many were created at this same time last year). If the current data ever deviates too much from the anticipated value, system 600 and/or the analyst may take action to, for example, investigate why the two values deviate by so much. Further, in some embodiments, a comprehensive data module (not shown) with historical basis and/or threshold data enables fraud management system 600 to deliver notifications and/or trigger automated actions when actual results deviate from expectations.

In one example embodiment, current performance is compared with historical results by aggregating results for the same hour in three to five previous weeks, excluding the highest and lowest values, and averaging the remaining values to generate the anticipated value. For example, consider the following database query pseudo-code:

```
SELECT ROUND (AVG (tcount)/60/2, 0) AS historical_basis
    -- Find the average of the top 3 of 4 historical counts
    -- Divide by two to get the benchmark value per system
FROM (
    SELECT tcount, tcount_week,
        DENSE_RANK( ) OVER (ORDER BY tcount DESC) drnk
    FROM (
    -- Get hourly counts from the same hour in each of the past four weeks
        SELECT COUNT(*) AS tcount, '1 week prior' AS tcount_week
        FROM trans_hist_tbl
        WHERE txn_datetime BETWEEN SYSDATE - 169/24 AND
        SYSDATE - 7
    UNION
        SELECT COUNT(*) AS tcount, '2 weeks prior' AS tcount_week
        FROM trans_hist_tbl
        WHERE txn_datetime BETWEEN SYSDATE - 337/24 AND
        SYSDATE - 14
    UNION
        SELECT COUNT(*) AS tcount, '3 weeks prior' AS tcount_week
        FROM trans_hist_tbl
        WHERE txn_datetime BETWEEN SYSDATE - 505/24 AND
        SYSDATE - 21
    UNION
        SELECT COUNT(*) AS tcount, '4 weeks prior' AS tcount_week
        FROM trans_hist_tbl
        WHERE txn_datetime BETWEEN SYSDATE - 673/24 and
        SYSDATE - 28
    ) full_set
)
-- Exclude the minimum value
WHERE drnk < 4
``` where historical_basis is the anticipated value based on historical data stored in table trans_hist_tbl.

In the example embodiment, fraud management system 600 generates information that may be used, for example, to determine and/or monitor the state of fraud detection system 118 and/or other external systems 118 associated with fraud detection of payment card transactions. Further, fraud management system 600 enables analysts and/or system 600 to monitor the presence of current baseline account data, whether the scoring sub-system is responding within specifications, whether cases are being properly generated, whether analysts are receiving and working cases, the prevalence of fraudulent activity within transaction processing, and at what rate customers are utilizing value-added features of fraud monitoring system 600 and/or fraud management system 118, such as, for example, hotlist insertions and web service calls. In addition, fraud management system 600 enables analysts and/or system 600 to monitor the rate of fraud declines in contrast with the rate of case creation, rule instantiations, and confirmed fraud, and the dollar volume of loss prevented by fraud detection system 118 as combined with customer information.

Aspects of fraud management server 610 and fraud management system 600 are described in greater detail below in respect to FIGS. 7-14.

Figure 7:
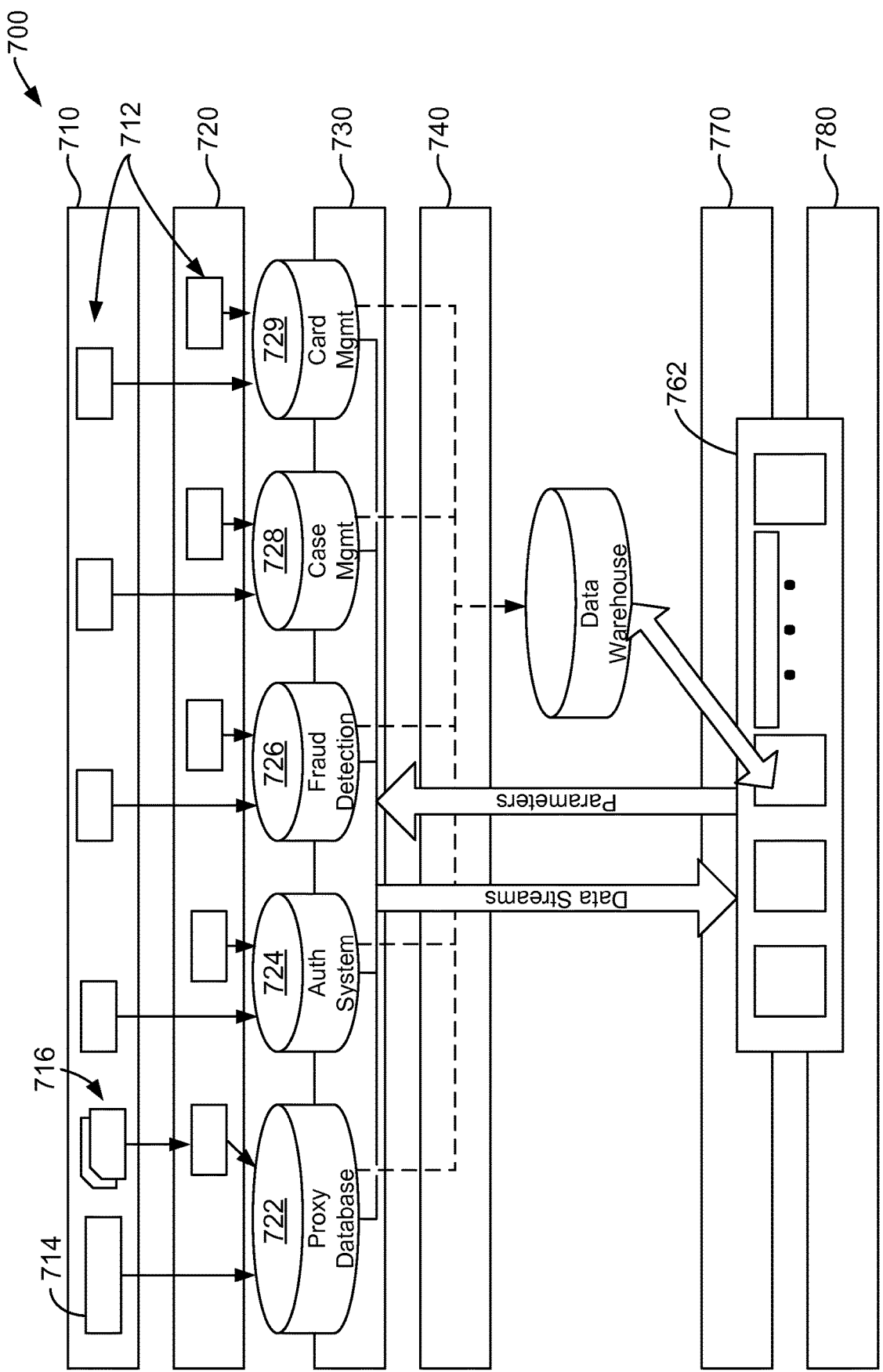

FIG. 7 is a diagram of an example data management system 700 for authorization and fraud monitoring of payment card transactions that is implemented, for example, on server 112 (shown in FIG. 2). In the example embodiment, data management system 700 includes an identify layer 710 which performs operations associated with identifying key information to combine with fraudulent transactions data 726 and fraud case management data 728, such as, for example, scoring individual transactions based on rules, models, or other mathematical functions, and making an initial determination whether individual transactions are fraudulent or not, such as, for example, based on the scoring. In some embodiments, data 724 from a transaction processing system (shown generally as systems 712), such as authorization details and cardholder demographics, and additional data 729 from a card management system (shown generally as systems 712), such as transaction authorization velocity, are integrated with fraud data to provide context. A transform layer 720 performs operations associated with the transformation of raw data into a format usable by external systems, and may include, for example, aggregation, indexing, segmentation, partitioning, and/or filtering of data. In some embodiments, third party systems 714 provide data 716 through a proxy database 722. Information created or identified by identify layer 710 and transform layer 720 are stored in one or more fraud databases 722 for future use.

Fraud management system 700 also includes a connect layer 730 and an integrate layer 740. In the example embodiment, connect layer 730 enables communication between source databases (e.g., databases 722, 724, 726, 728, 729) and a dashboard application 762. In some embodiments, dashboard application 762 is similar to fraud management server 610 (shown in FIGS. 6A and 6B), and databases 722, 724, 726, 728, 729 are similar to databases 660 (shown in FIG. 6B). An integrate layer 740 performs operations associating data from multiple databases and applications, including a data warehouse 750. In some embodiments, data warehouse 750 is similar to data warehouse 612 (shown in FIG. 6A). Resulting data sets integrated for presentation for dashboard 762 may also be aggregated in data warehouse 750 for future reporting and historical trend analysis.

Further, in the example embodiment, fraud management system 700 includes a combine layer 760 and a correlate layer 770 that provide data for dashboard application 762. Dashboard application 762 includes display data associated with fraud detection, analysis, and management such as, for example, information on cases created, confirmed cases of fraud, online activity, activity per issuer, activity per acquirer, virtual analyst activity, web service response time trends, rules deployed, and/or rules engaged. Such data may be displayed, for example, to user 616 (shown in FIG. 6). The generation and display of such display data is described in greater detail below with respect to FIGS. 8-14. Such data may be used by user 616, such as a fraud analyst, to, for example, identify trends in recent fraudulent activity, identify trends in and/or monitor health of fraud detection system 118, and take corrective actions based on the outputs displayed.

In some embodiments, functionality provided by identify layer 710, transform layer 720, connect layer 730, and integrate layer 740 are provided by fraud detection system 118 (shown in FIG. 6), while data warehouse 750, dashboard 762, and functionality provided by combine layer 760 and 770 are provided by fraud management system 600 (shown in FIG. 6). Also, in some embodiments, dashboard application 762 may include dashboard display 614 (shown in FIG. 6), and may be provided by fraud management server 610 (shown in FIG. 6).

Figure 8:
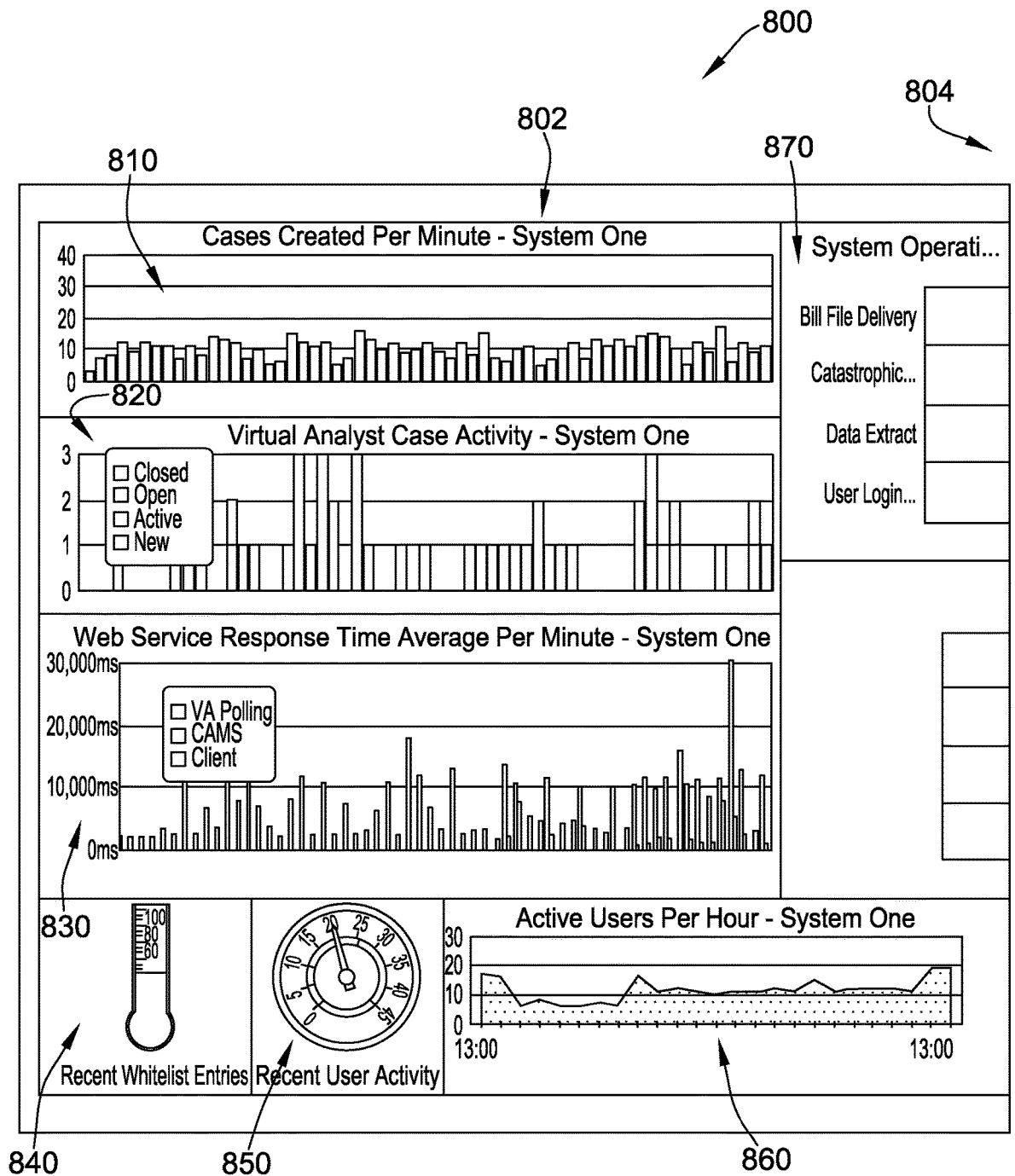

FIG. 8 is a diagram of a portion of an example user interface 800 showing a plurality of information display areas that are generated by fraud management system 600 (shown in FIG. 6) and displayed to a fraud analyst such as user 616 (shown in FIG. 6). In some embodiments, user interface 800 may be provided by dashboard application 762 (shown in FIG. 7). In the example embodiment, a left portion 802 of interface 800 displays data related to a first data management system ("System One"), and a right portion 804 (not shown in FIG. 8 for purposes of convenience), similar to left portion 802, displays data related to a second data management system ("System Two"). User interface 800 is suitable and scalable to multiple co-processing fraud management systems (e.g., System One and System Two). In some embodiments, a greater degree of distribution may enable the systems described herein to provide greater value.

In the example embodiment, case creation graphs are displayed based on, for example, the number of fraud cases created by one or more fraud detection systems 118. In the example embodiment, left portion 802 includes a case creation graph 810 which displays a graph of the number of fraud cases (vertical axis) created per minute (horizontal axis). Left portion 802 also includes a case activity graph 820 which displays a number of opened, closed, active, and/or new fraud cases (vertical axis) during each minute (horizontal axis). Left portion 802 further includes a web service response time graph 830 which displays the average response time (vertical axis) during each minute (horizontal axis).

In some embodiments, graphs 810, 820, and 830 have the same horizontal axis of time (i.e., each showing the same window of time) and are approximately aligned vertically such that an analyst can easily correlate data across the three graphs. In the example embodiment, graphs 810, 820, and 830 are displayed (i.e., refreshed) in real time. "Real time," in this context, means that the event information displayed to an analysis (e.g., user 616 shown in FIG. 6A) may be displayed within moments of actual events, and may be refreshed with new aggregated data in intervals such as, for example, every second, or every 10 seconds, or every minute, or every five minutes. In other words, the right edge of graphs 810, 820, and 830 may represent the most recent block of time (e.g., the most recent 1 minute of data), and thus the horizontal axis may shift, removing data from the left edge as time progresses. The data may be filtered, for example, by issuer, by analyst group, by fraud rule, and/or by system or component.

In some embodiments, case creation graphs may be displayed based on, for example, the number of fraud cases created by one or more fraud detection systems 118. An analyst may monitor the health of fraud detection system 118 with the case creation graphs such that a sustained zero-quantity of cases created may indicate that fraud detection system 118 is not operating properly. The analyst may analyze trends with the case creation graphs such that a spike in number of cases created may indicate, for example, the start of a large-scale or concerted fraud attack. Cases of confirmed fraud are reported for one or more fraud detection systems 118, such as "System One" and "System Two."

In the example embodiment, left portion 802 also includes a recent whitelist entries graph 840, a recent user activity graph 850, and an active users per hour graph 860, giving the analyst a view into these additional metrics, which may further be used in conjunction with graphs 810, 820, and 830 to correlate events.

In some embodiments, fraud management system 600 and/or dashboard application 762 may analyze the subject data of the various graphs generated and displayed to the analyst (e.g., graphs 810, 820, and 830) against one or more thresholds and/or nominal ranges associated with the underlying data. For example, dashboard application 762 may identify thresholds associated with the case generation rate, or the number of cases generated per minute (e.g., the subject of graph 810). Upon determining that a threshold has been exceeded (e.g., by the most recent data points, or any data point within graph 810) or out-of-band, dashboard application 762 may generate an alert (e.g., via email or on screen). In some embodiments, dashboard application 762 may display a visual indication on interface 800 when a threshold is exceeded. For example, in some embodiments, dashboard application 762 may display a notification indicator next to graph 810, or overlaid upon graph 810 (e.g., at or near where the threshold was exceeded). In some embodiments, dashboard application 762 may modify graph 810 based at least in part on the exceeded threshold. For example, a color of graph 810 (e.g., plots or data within graph 810) may be altered with graph 810 to make one or more data elements stand out relative to the others, or some data may be recessed, subdued, or otherwise visually obscured when a threshold or a nominal range is exceeded. In some embodiments, dashboard application 762 may provide recommended courses of action based on these alert conditions. Further, in some embodiments, dashboard application 762 may identify threshold conditions that combine multiple data sets (e.g., number of cases generated and case activity) to generate alerts, on-screen visual indicators, and/or visual changes to graphs.

In some embodiments, other graph combinations may be shown together in left area 802. Additional example graphs and combinations of graphs are discussed below in reference to FIGS. 9-13.

Figure 9:
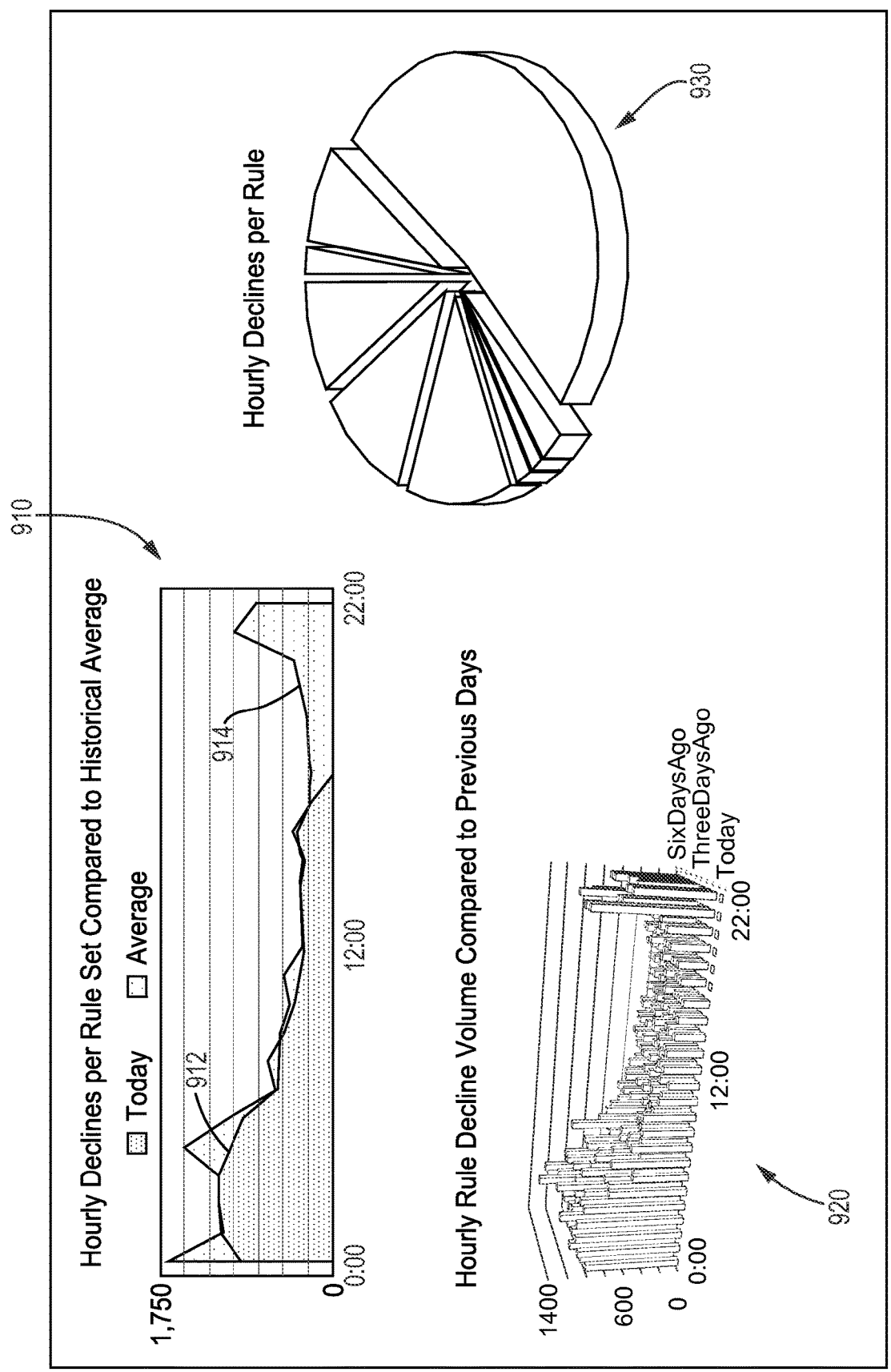

FIG. 9 is a diagram of an example set of graphs 910, 920, and 930 that are generated by fraud management system 600 (shown in FIG. 6) for display to user 616 (shown in FIG. 6A). In some embodiments, graphs 910, 920, and 930 may be displayed as graphs within interface 800 (shown in FIG. 8). In the example embodiment, an hourly declines per rule graph 910 plots a number of hourly declines for a particular rule or set of rules (vertical axis) over time (horizontal axis). Graph 910 includes two plots, a "today" plot 912 showing today's values and an "average" plot 914 showing a historical average (e.g., for some pre-determined past period, such as the previous month). The "average plot" 914 may be used by the analyst as, generally speaking, what is expected to happen over the course of the day, while the "today" plot 912 is what is actually happening today. Rule activity represents how many times the rule or set of rules was triggered (e.g., causing a transaction decline) during each time segment for the given system.

In the example embodiment, hourly rule decline graph 920 is a bar graph plotting a number of hourly declines for a particular rule or set of rules (vertical axis) over time (horizontal axis) for the current day and a pre-defined number of past days (e.g., the past six days) (third, deep axis). Today's data is shown as the front-most row, while six days ago data is shown as the back-most row. Each day's data is oriented on the same time axis (horizontal axis) such that today's data for that same hour of time may be easily viewed against past days' data.

Further, in the example embodiment, hourly declines pie chart 930 is a pie chart plotting the composure of a particular hour's declines (or other pre-determined period of time) based on which rules fired (e.g., invoked to decline a transaction) during that hour. In some embodiments, the analyst may select a particular hour of interest (e.g., from clicking on graph 910 or 920), and pie chart 930 is populated based on how many times each particular rule fired, as a percentage of all rules fired during that hour. In other words, each separate pie piece of graph 930 represents an individual rule, and the size of that pie piece represents the percentage of times that rule fired in the hour relative to all other rule declines in that hour.

Figure 10:
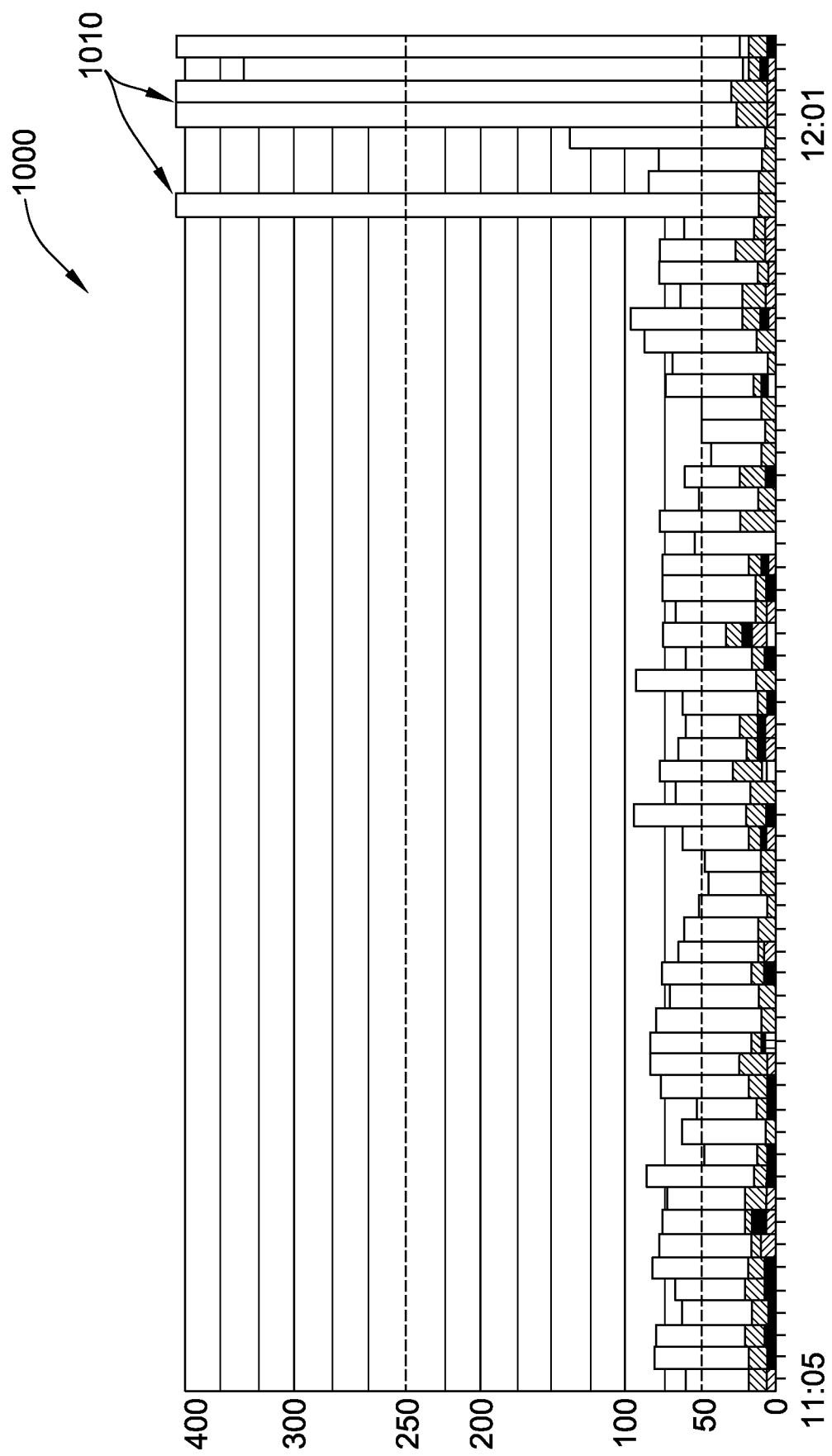

FIG. 10 is a graph 1000 generated by fraud management system 610 (shown in FIG. 6A) for display to user 616 (shown in FIG. 6A). Graph 1000 shows a number of declines (vertical axis) by minute (horizontal axis), but other time values could be utilized. Within each minute bar, several decline categories may be present, each stacking onto the other non-zero categories up to a total number of declines across the set of categories. In the example embodiment, graph 1000 enables the analyst to see both a "normal" average for a particular group over the last hour, or some other pre-determined time frame. In some embodiments, the categories may be configured to be a particular set of issuers (e.g., all of their associated payment cards). In other embodiments, the categories may be sets of cards for one or more issuers (e.g., groups of BIN numbers). In still other embodiments, the categories may be one or more rules or sets of rules.

For example, presume the white (non-shaded) bar segments represent a particular issuer. As such, the analyst may presume that an approximate average number of declines for that issuer's cards is approximately 50 (e.g., an approximate average as shown between time 11:05 and time 11:50). Some fraudsters may perpetrate a brute-force style attack on one or more cards for that same issue. The brute-force attack may involve, for example, a fraudster repeatedly submitting many transactions to the payment network with one or more payment card numbers (PANs), but changing a card verification number (e.g., CVN, CVV) until the proper verification number is determined (e.g., by completing a transaction). Under this type of an attack, many declines for a particular issuer may be generated, and thus show as aberrations 1010 in the graph, as shown in the approximately 400 declines per minute around 12:00 on graph 1000. In some embodiments, the analyst may click on a given bar segment on the graph and be presented with information about the group, information about each of the particular declines, and/or information about the terminal from which the declines are originating (e.g., the point of sale device being used to conduct the transaction).

Figure 11:
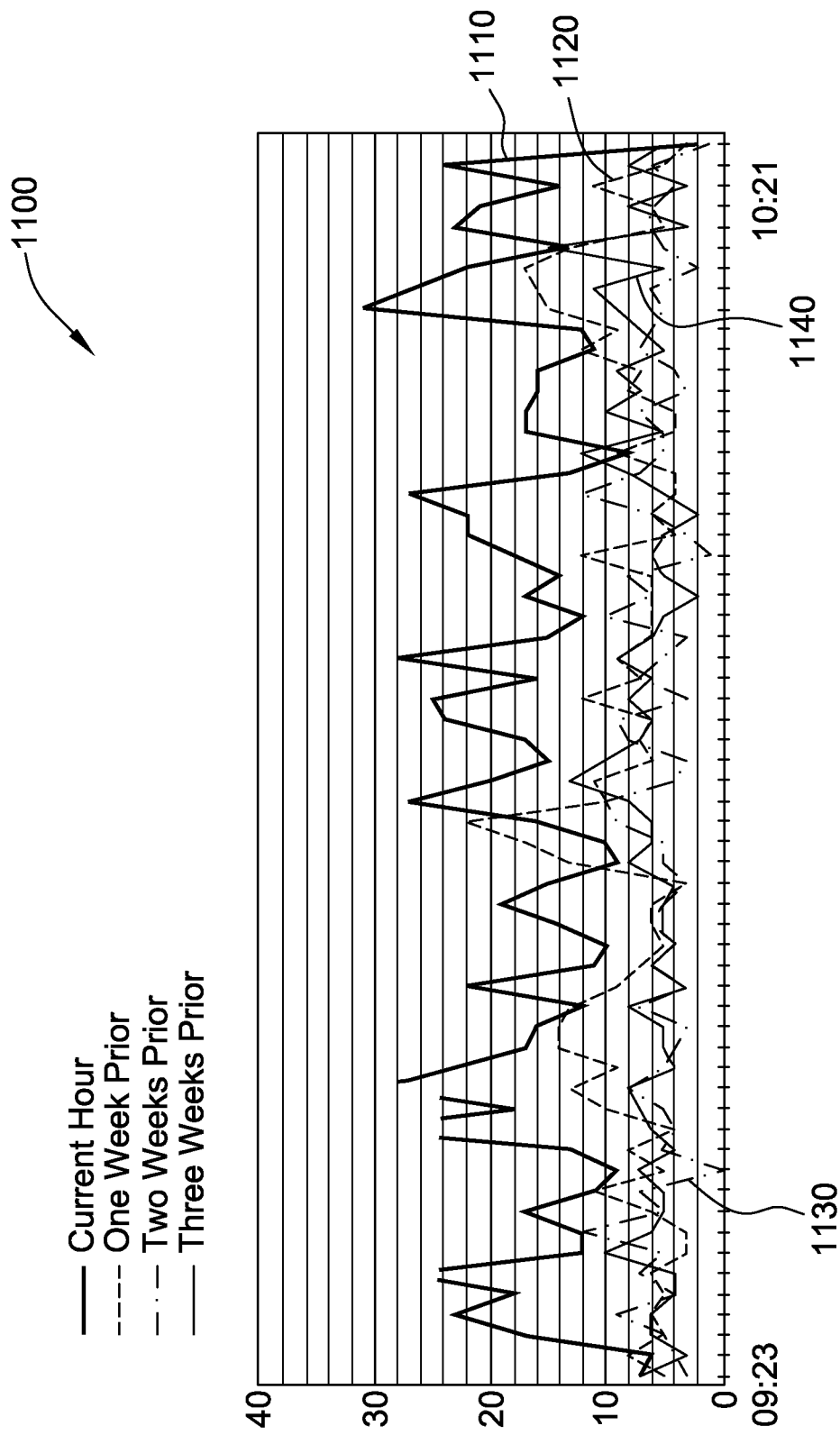

FIG. 11 is a graph 1100 of rule activity that may be presented to an analyst by fraud management server 610 (shown in FIG. 6B) or dashboard application 762 (shown in FIG. 7). In the example embodiment, graph 1100 includes four plots: current hour plot 1110, one week prior plot 1120, two week prior plot 1130, and three week prior plot 1140. Each of plots 1110, 1120, 1130, and 1140 illustrate a number of declines (vertical axis) generated by a single decline rule at a particular time (horizontal axis) (e.g., between 09:23 and 10:23 on some particular day): current hour plot 1110 shows the most current hour (e.g., the current day's data, between 09:23 and 10:23); one week prior plot 1120 shows data from a week before (e.g., between 09:23 and 10:23 7 days prior to the current day); two weeks prior plot 1130 shows data from two weeks before (e.g., between 09:23 and 10:23 fourteen days prior to the current day); and three weeks prior plot 1140 shows data from three weeks before (e.g., between 09:23 and 10:23 twenty-one days prior to the current day).

In the example embodiment, the analyst may look at a peak in plot 1110 and notice that the peak is much higher than the other three plots 1120, 1130, 1140. From this, the analyst may think that there may be an event going on that the subject rule is trapping. However, the analyst may look at the entire hour of plot 1110 as compared to plots 1120, 1130, and 1140 and notice that plot 1110 is significantly higher than the other plots across the entire hour. This may indicate an aberration in the functioning of the rule. For example, the subject rule may have recently been modified, and as such may be trapping (e.g., denying) too many transactions. As such, the analyst may be prompted to investigate operation of the rule itself (e.g., as opposed to a particular fraudulent event) to determine, for example, if the rule has been somehow misconfigured. As such, the performance of one or more rules may be analyzed and/or compared to their previous versions or across systems.

Figure 12:
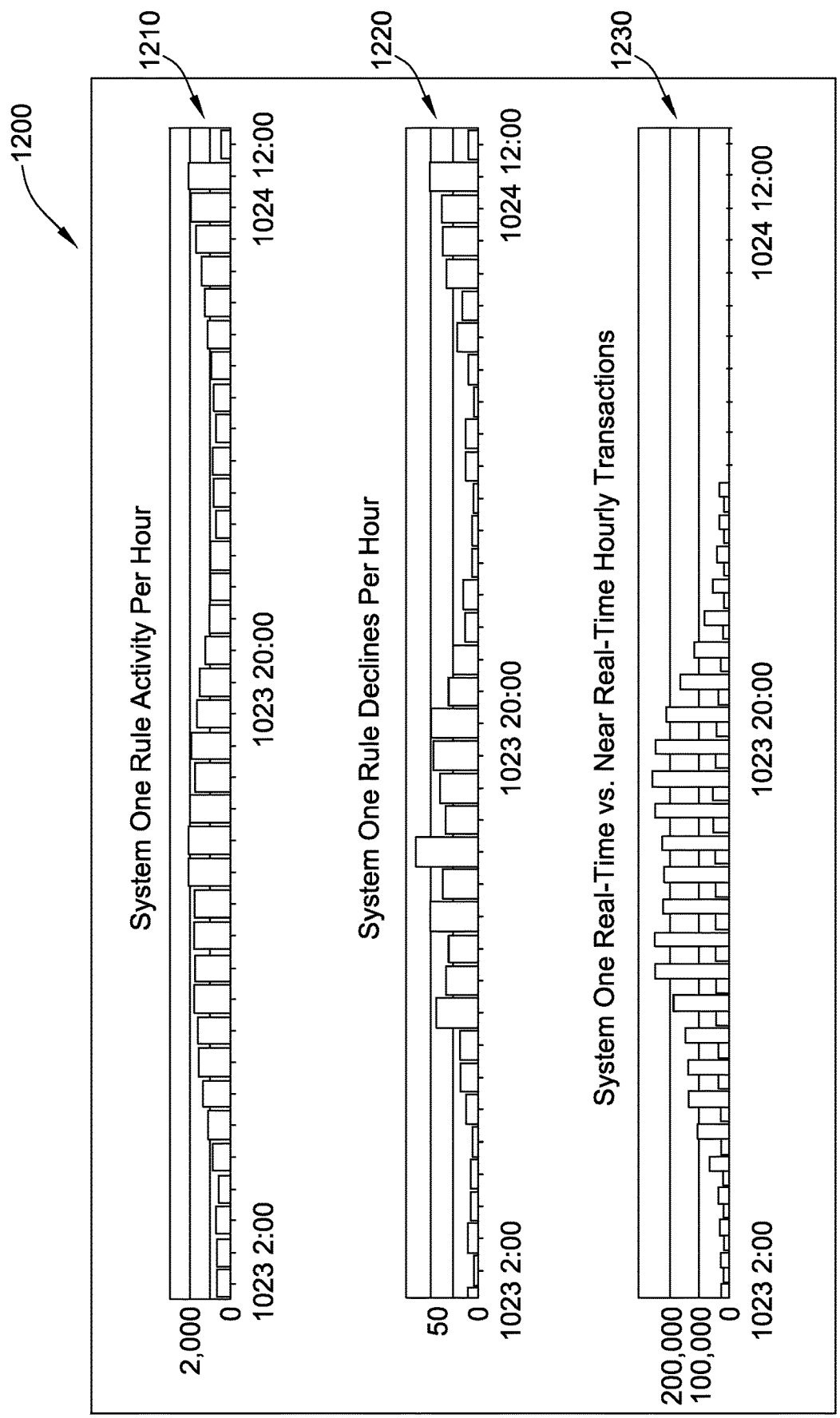

FIG. 12 is a diagram 1200 of an example set of graphs 1210, 1220, and 1230 that are generated by fraud management system 600 (shown in FIG. 6) for display to user 616 (shown in FIG. 6A). Graph 1210 shows the amount of rule activity (vertical axis) per hour (horizontal axis) over a period of time. Graph 1220 shows the amount of rule declines (vertical axis) per hour (horizontal axis) over that same period of time. Graph 1230 shows real-time and near real-time transactions (vertical axis) per hour (horizontal axis) over that same time period, with real-time transactions represented by the generally taller bar of each pair for a given hour of the time period. As described above, graphs 1210, 1220, and 1230 are aligned horizontally such that times of the horizontal axis are aligned.

Figure 13:
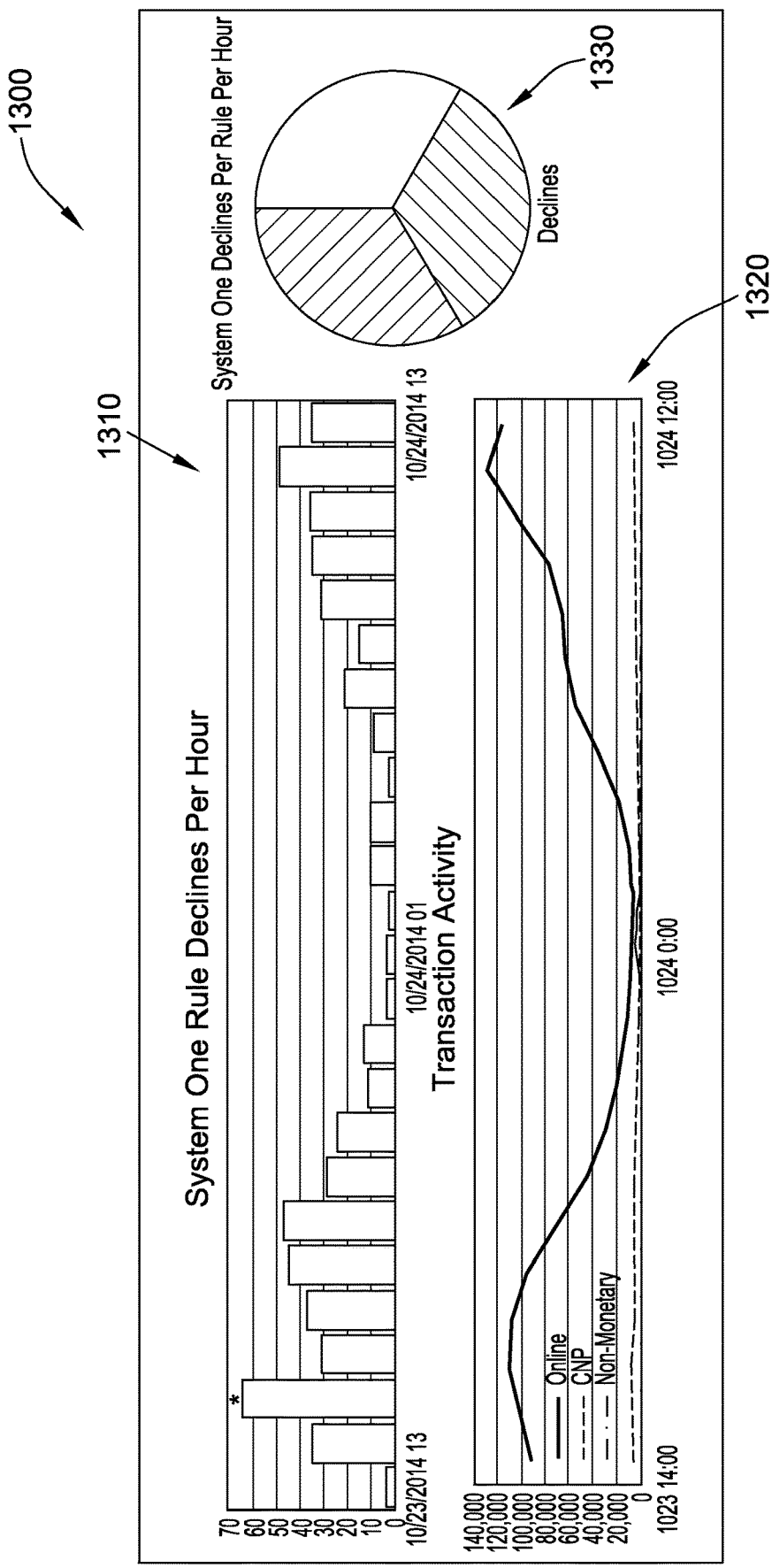

FIG. 13 is a diagram 1300 of an example set of graphs 1310, 1320, and 1330 that are generated by fraud management system 600 (shown in FIG. 6) for display to user 616 (shown in FIG. 6A). Graph 1310 shows the number of rule declines (e.g., for a single rule or set of rules) (vertical axis)

per hour (horizontal axis) for a period of time. Graph 1320 shows the total transaction activity (vertical axis) within the prevue of the rule or set of rules that are the subject of Graph 1310, per hour (horizontal axis). Graph 1330 shows a breakdown a particular hour, showing each rule as a separate pie piece, with the size of the piece as a percentage of that hour's declines total relative to the other subject rules. As described above, for example, the analyst may click on a particular hour displayed on graph 1310 to generate graph 1330 for that particular hour.

Figure 14:
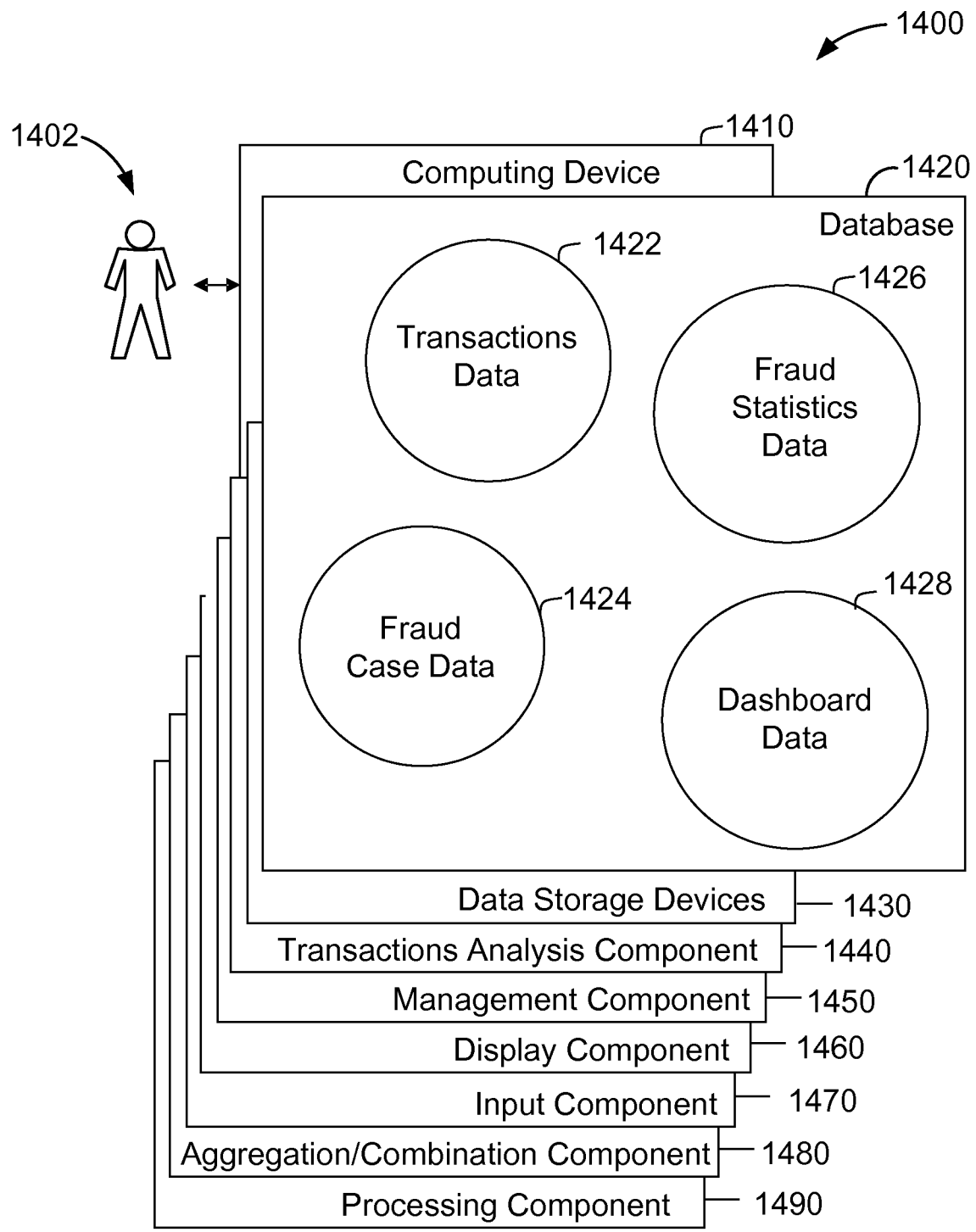

FIG. 14 shows an example configuration 1400 of a database 1420 within a computing device 1410, along with other related computing components, that may be used during fraud monitoring of payment card transactions. Database 1420 is coupled to several separate components within computing device 1410, which perform specific tasks.

In the example embodiment, database 1420 includes transactions data 1422, fraud case data 1424, fraud statistics data 1426, and dashboard data 1428. Transactions data 1422 includes information on payment card transactions that may be monitored for fraudulent activity by, for example, fraud detection system 118 (shown in FIG. 6). Fraud case data 1424 includes information on fraud cases that may be opened and/or tracked by fraud detection system 118 and/or fraud management system 600 (shown in FIG. 6). Fraud statistics data 1426 includes configuration information on, for example, statistics data, aggregation data, and/or correlation data such as may be generated by fraud management system 600. Dashboard data 1428 includes display information such as may be presented by fraud management system 600 to an analyst 1402.

Computing device 1410 includes the database 1420, as well as data storage devices 1430. Computing device 1410 also includes a transactions analysis component 1440 for analyzing payment card transactions using, for example, the information in transactions data 1422. Computing device 1410 also includes a dashboard component 1450 for processing information such as, for example, fraud case data 1524, fraud statistics data 1526, and/or dashboard data 1428. A display component 1460 is also included for processing and presenting graphical display items such as shown in FIGS. 7-14. An input component 1470 is included for communicating between, for example, fraud detection system 118 and fraud management system 600. An aggregation/combination component 1480 provides processing functionality with regard to analyzing data such as, for example, transactions data 1422 and fraud case data 1424 to populate fraud statistics data 1426. A processing component 1490 assists with execution of computer-executable instructions associated with the fraud management system.

Figure 15:
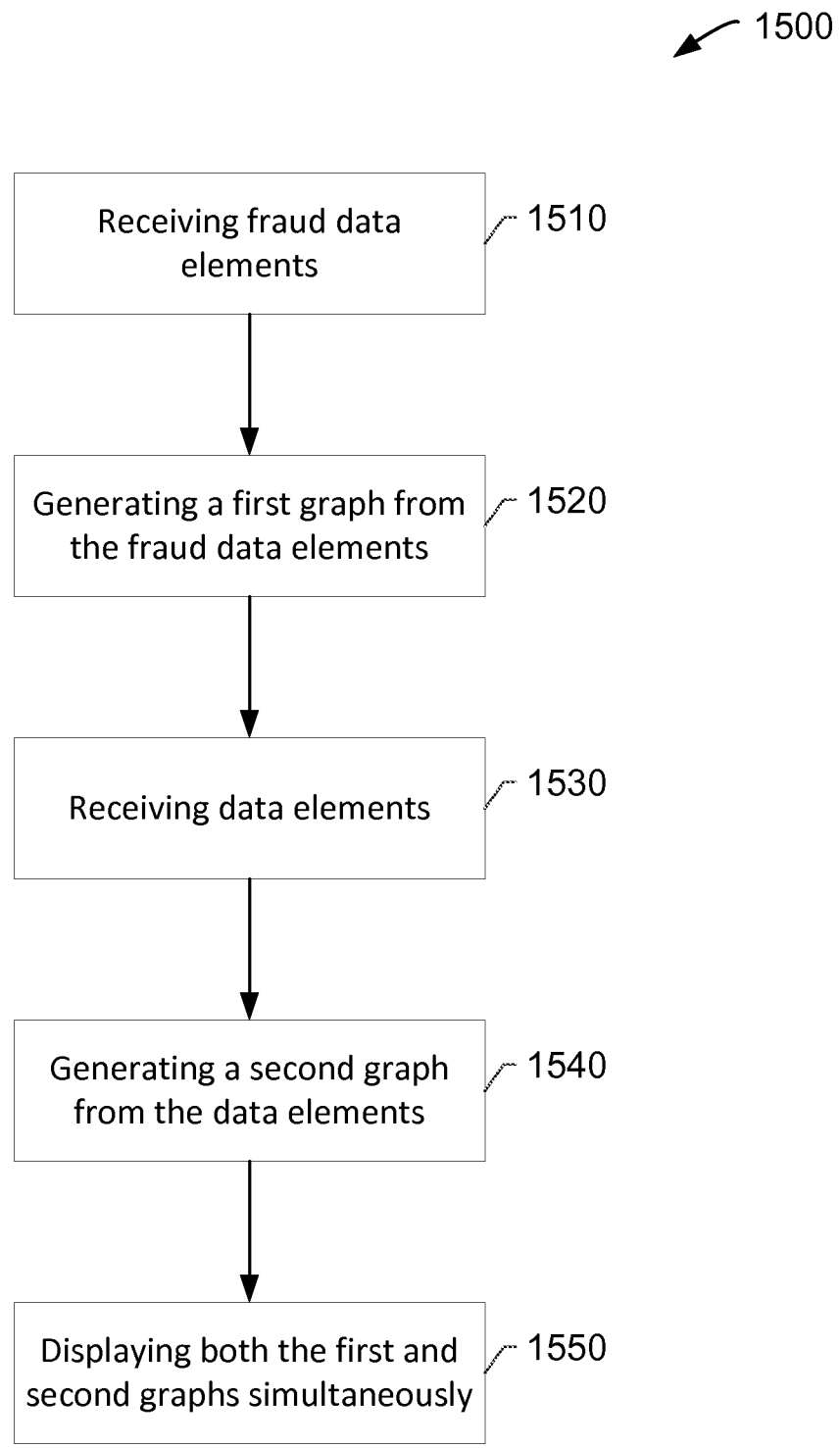

FIG. 15 is an example method 1500 for detecting fraudulent network transactions in a payment card transaction network such as system 20 (shown in FIG. 1). In the example embodiment, method 1500 is performed by a computing system such as server 112 (shown in FIG. 2), transaction processing system 122 (shown in FIG. 3), fraud detection system 118 (shown in FIGS. 2 and 6A), fraud management system 610 (shown in FIGS. 6A and 6B) and/or transaction system 620 (shown in FIG. 6B).

In the example embodiment, method 1500 includes receiving 1510 a first plurality of fraud data elements associated with a plurality of payment card transactions from a fraud detection system. In some embodiments, receiving 1510 a first plurality of fraud data elements includes receiving a first plurality of fraud data associated with payment transaction declines based at least in part on a set of one or more decline rules. In some embodiments, receiving a first plurality of fraud data elements includes receiving data associated with fraud cases created by the fraud detection system. In the example embodiment, method 1500 also includes generating 1520, by the processor, a first graph from the first plurality of fraud data elements. In some embodiments, generating 1520 a first graph further includes plotting a first plot and a second plot on the first graph, wherein the first plot includes payment transaction declines for a first period of time, wherein the second plot includes payment transaction declines for a historical period of time prior to the first period of time.

In the example embodiment, method 1500 further includes receiving 1530 a first plurality of data elements associated with the plurality of payment card transactions from a second system. In some embodiments, receiving 1530 a first plurality of data elements includes receiving a first plurality of data elements associated with rule activity based at least in part on a set of one or more decline rules. Method 1500 also includes generating 1540, by the processor, a second graph from the first plurality of data elements.

Further, in the example embodiment, method 1500 includes displaying 1550 both of the first graph and the second graph simultaneously to a user on the display device, thereby enabling the user to detect fraudulent events in the payment card transaction network. In some embodiments, the first graph covers a first time period, wherein the second graph covers a second time period that at least partially overlaps with the first time period. Further, in some embodiments, displaying 1550 both the first graph and the second graph further includes aligning a time axis for each of the first graph and the second graph vertically based on an overlapping portion of the first time period and the second time period, thereby enabling the user to vertically compare data on the first graph to corresponding data at the same time on the second graph. Also, in some embodiments, method 1500 also includes at least one of identifying a threshold associated with at least one of the first plurality of fraud data elements and the first plurality of data elements, determining that the pre-defined threshold has been exceeded, and altering one or more of the first graph and the second graph based at least in part on the determining, such that the user is visually alerted that the threshold has been exceeded.

As will be appreciated based on the foregoing specification, the above-described embodiments of the disclosure may be implemented using computer programming or engineering techniques including computer software, firmware, hardware or any combination or subset thereof, wherein the technical effect is providing a data monitoring display to a fraud analyst for fraud monitoring of a payment card network. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of methods and systems of fraud monitoring of payment card transactions. As a result, the methods and systems described herein facilitate monitoring fraudulent transactions occurring within a payment network, monitoring the systems that monitor fraudulent transactions, and identifying trends in fraud in real time.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computing device for detecting fraudulent network events in a payment card transaction network, said computing device comprising a processor and a user interface display device, said computing device programmed to:

receive a plurality of fraud data elements associated with a plurality of payment card transactions from a fraud detection computer system, wherein receiving the plurality of fraud data elements includes receiving fraud data elements associated with payment transaction declines based at least in part on a set of one or more decline rules;

generate a first graph from the plurality of fraud data elements, the first graph including a first graph horizontal axis that represents a predetermined period of time, wherein a first plot and a second plot are plotted on the first graph, wherein the first plot includes current payment transaction declines for a time-of-day period, and wherein the second plot includes historical payment transaction declines for the time-of-day period from at least one week prior to the current time;

receive a plurality of transaction processing data elements associated with the plurality of payment card transactions from a transaction processing computer system;

generate a second graph from the plurality of transaction processing data elements, the second graph including a second graph horizontal axis that represents the same predetermined period of time as the first graph horizontal axis;

display both of the first graph and the second graph simultaneously to a user on the user interface display device, wherein the first graph horizontal axis is aligned with the second graph horizontal axis to enable the user to compare the first graph with the second graph, wherein the first graph and the second graph are refreshed in real time;

receive, from the user, a selection of a portion of at least one of the first graph and the second graph, the selection associated with a portion of the displayed predetermined time;

generate a third graph in response to the received selection, wherein the third graph is displayed simultaneously with the first graph and the second graph to the user on the user interface display device, and wherein the third graph displays details of the fraud data elements for the portion of the displayed predetermined time;

store a first threshold associated with the plurality of fraud data elements;

store a second threshold associated with the plurality of transaction processing data elements;

compare the plurality of fraud data elements to the first threshold;

compare the plurality of transaction processing data elements to the second threshold;

determine that at least one of i) the plurality of fraud data elements exceed the first threshold and ii) the plurality of transaction processing data elements exceed the second threshold;

display a visual indication on the user interface display device simultaneously with the first and second graphs based on the determination, wherein the visual indication includes at least one of (i) a notification indicator and (ii) a change of color of the data elements displayed in at least one of the first and the second graphs; and generate an alert based on the determination.

2. The computing device of claim 1, wherein the first graph includes a plurality of graphs.

3. The computing device of claim 1, wherein receiving the plurality of transaction processing data elements includes receiving a plurality of transaction processing data elements associated with rule activity based at least in part on a set of one or more decline rules.

4. The computing device of claim 1, wherein receiving the plurality of fraud data elements includes receiving data associated with fraud cases created by the fraud detection computer system.

5. The computing device of claim 1, wherein the computing device is further configured to monitor that the fraud detection computer system and the transaction processing computer system are operating within predefined specifications.

6. A computer-implemented method for detecting fraudulent network transactions in a payment card transaction network, said method using a computing device having a processor and a user interface display device, said method comprising:

receiving a plurality of fraud data elements associated with a plurality of payment card transactions from a fraud detection computer system, wherein receiving the plurality of fraud data elements includes receiving fraud data elements associated with payment transaction declines based at least in part on a set of one or more decline rules;

generating, by the processor, a first graph from the plurality of fraud data elements, the first graph including a first graph horizontal axis that represents a predetermined period of time, wherein a first plot and a second plot are plotted on the first graph, wherein the first plot includes current payment transaction declines for a time-of-day period, and wherein the second plot includes historical payment transaction declines for the time-of-day period from at least one week prior to the current time;

receiving a plurality of transaction processing data elements associated with the plurality of payment card transactions from a transaction processing computer system;

generating, by the processor, a second graph from the plurality of transaction processing data elements, the second graph including a second graph horizontal axis that represents the same predetermined period of time as the first graph horizontal axis;

displaying both of the first graph and the second graph simultaneously to a user on the user interface display device, wherein the first graph horizontal axis is aligned with the second graph horizontal axis to enable the user to compare the first graph with the second graph, wherein the first graph and the second graph are refreshed in real time;

receive, from the user, a selection of a portion of at least one of the first graph and the second graph, the selection associated with a portion of the displayed predetermined time;

generate a third graph in response to the received selection, wherein the third graph is displayed simultaneously with the first graph and the second graph to the user on the user interface display device, and wherein the third graph displays details of the fraud data elements for the portion of the displayed predetermined time;

storing a first threshold associated with the plurality of fraud data elements;

storing a second threshold associated with the plurality of transaction processing data elements;

comparing the plurality of fraud data elements to the first threshold;

comparing the plurality of transaction processing data elements to the second threshold;

determining that at least one of i) the plurality of fraud data elements exceed the first threshold and ii) the plurality of transaction processing data elements exceed the second threshold;

displaying a visual indication on the user interface display device simultaneously with the first and second graphs based on the determination, wherein the visual indication includes at least one of (i) a notification indicator and (ii) a change of color of the data elements displayed in at least one of the first and the second graphs; and generating an alert based on the determination.

7. The computer-implemented method of claim 6, wherein the first graph includes a plurality of graphs.

8. The computer-implemented method of claim 6, wherein receiving the plurality of transaction processing data elements includes receiving a plurality of transaction processing data elements associated with rule activity based at least in part on a set of one or more decline rules.

9. The computer-implemented method of claim 6, wherein receiving the plurality of fraud data elements includes receiving data associated with fraud cases created by the fraud detection computer system.

10. The computer-implemented method of claim 6 further comprising monitoring that the fraud detection computer system and the transaction processing computer system are operating within predefined specifications.

11. At least one non-transitory computer-readable storage medium having computer-executable instructions embodied thereon wherein, when executed by at least one processor, the computer-executable instructions cause the processor to:

receive a plurality of fraud data elements associated with a plurality of payment card transactions from a fraud detection computer system, wherein receiving the plurality of fraud data elements includes receiving fraud data elements associated with payment transaction declines based at least in part on a set of one or more decline rules;

generate a first graph from the plurality of fraud data elements, the first graph including a first graph horizontal axis that represents a predetermined period of time, wherein a first plot and a second plot are plotted on the first graph, wherein the first plot includes current payment transaction declines for a time-of-day period, and wherein the second plot includes historical payment transaction declines for the time-of-day period from at least one week prior to the current time;

receive a plurality of transaction processing data elements associated with the plurality of payment card transactions from a transaction processing computer system;

generate a second graph from the plurality of transaction processing data elements, the second graph including a second graph horizontal axis that represents the same predetermined period of time as the first graph horizontal axis;

display both of the first graph and the second graph simultaneously to a user on a user interface display device, wherein the first graph horizontal axis is aligned with the second graph horizontal axis to enable the user to compare the first graph with the second graph, wherein the first graph and the second graph are refreshed in real time;

receive, from the user, a selection of a portion of at least one of the first graph and the second graph, the selection associated with a portion of the displayed predetermined time;

generate a third graph in response to the received selection, wherein the third graph is displayed simultaneously with the first graph and the second graph to the user on the user interface display device, and wherein the third graph displays details of the fraud data elements for the portion of the displayed predetermined time;

store a first threshold associated with the plurality of fraud data elements;

store a second threshold associated with the plurality of transaction processing data elements;

compare the plurality of fraud data elements to the first threshold;

compare the plurality of transaction processing data elements to the second threshold;

determine that at least one of i) the plurality of fraud data elements exceed the first threshold and ii) the plurality of transaction processing data elements exceed the second threshold;

display a visual indication on the user interface display device simultaneously with the first and second graphs based on the determination, wherein the visual indication includes at least one of (i) a notification indicator and (ii) a change of color of the data elements displayed in at least one of the first and the second graphs; and generate an alert based on the determination.

12. The computer-readable storage medium of claim 11, wherein the first graph includes a plurality of graphs.

13. The computer-readable storage medium of claim 11, wherein receiving the plurality of transaction processing data elements includes receiving a plurality of transaction processing data elements associated with rule activity based at least in part on a set of one or more decline rules.

14. The computer-readable storage medium of claim 11, wherein receiving the plurality of fraud data elements includes receiving data associated with fraud cases created by the fraud detection computer system.

15. The computer-readable storage medium of claim 11, wherein the computer-executable instructions further cause the processor to monitor that the fraud detection computer system and the transaction processing computer system are operating within predefined specifications.

* * * * *